(12) United States Patent
Nair et al.

(10) Patent No.: US 10,982,081 B2
(45) Date of Patent: Apr. 20, 2021

(54) HYDROCARBON RESINS FOR BUTYL BASED COMPOSITIONS AND METHODS OF MAKING THE SAME

(71) Applicant: ExxonMobil Chemical Patents Inc., Baytown, TX (US)

(72) Inventors: Sujith Nair, League City, TX (US); Ranjan Tripathy, Sugar Land, TX (US); Sunny Jacob, Seabrook, TX (US); Yuan-Ju Chen, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/634,389

(22) PCT Filed: May 31, 2018

(86) PCT No.: PCT/US2018/035305
§ 371 (c)(1),
(2) Date: Jan. 27, 2020

(87) PCT Pub. No.: WO2019/036085
PCT Pub. Date: Feb. 21, 2019

(65) Prior Publication Data
US 2020/0172718 A1    Jun. 4, 2020

Related U.S. Application Data

(60) Provisional application No. 62/547,349, filed on Aug. 18, 2017.

(30) Foreign Application Priority Data

Oct. 12, 2017 (EP) .................................. 17196049

(51) Int. Cl.
| | | |
|---|---|---|
| C08L 23/22 | (2006.01) | |
| B60C 1/00 | (2006.01) | |
| C08F 212/08 | (2006.01) | |
| C08F 232/04 | (2006.01) | |
| C08F 236/04 | (2006.01) | |
| C08L 23/28 | (2006.01) | |

(52) U.S. Cl.
CPC ............ *C08L 23/22* (2013.01); *B60C 1/0008* (2013.01); *C08F 212/08* (2013.01); *C08F 232/04* (2013.01); *C08F 236/045* (2013.01); *C08L 23/283* (2013.01); *C08L 2205/025* (2013.01); *C08L 2205/03* (2013.01); *C08L 2205/035* (2013.01)

(58) Field of Classification Search
CPC .... C08F 212/00; C08F 212/02; C08F 212/04; C08F 212/06; C08F 212/08; C08F 232/00; C08F 232/02; C08F 232/04; C08F 232/06; C08F 232/08; C08L 9/00; C08L 23/00; C08L 23/16; C08L 23/18; C08L 23/20; C08L 23/22; C08L 23/24; C08L 23/283; C08L 91/00; C08L 93/00; C08L 2205/025; C08L 2205/03; C08L 2205/035; C09J 123/22; C09J 123/283; B60C 1/00; B60C 1/0008; B60C 1/0016; B60C 1/0025; B60C 1/0041
See application file for complete search history.

(56) References Cited

U.S. PATENT DOCUMENTS

| | | |
|---|---|---|
| 7,666,341 B2 | 2/2010 | Pearce |
| 2004/0092648 A1* | 5/2004 | Jones .................... C08L 23/283 524/502 |
| 2013/0331498 A1 | 12/2013 | Miyazaki |
| 2018/0194934 A1 | 7/2018 | Varagniat |

FOREIGN PATENT DOCUMENTS

| | | |
|---|---|---|
| EP | 2 348 077 A | 7/2011 |
| WO | 2012/050658 A | 4/2012 |

OTHER PUBLICATIONS

Chen, Mingtao, "Bridging Mesoscale Phenomena and Macroscopic Properties in Block Copolymers Containing Ionic Interactions and Hydrogen Bonding" Virginia Polytechnic Institute and State University Dissertation, May 30, 2018. (Year: 2018).*

* cited by examiner

*Primary Examiner* — Christopher M Rodd

(57) ABSTRACT

Butyl based composition having hydrocarbon resins are provided herein. The hydrocarbon resin has a Tg from −10° C. to 25° C., a number average molecular weight between 20 to 500, a weight average molecular weight between about 100 to about 2000, and a glass transition temperature between about 0° C. to about −80° C.

20 Claims, 5 Drawing Sheets

HYDROCARBON RESINS FOR BUTYL BASED COMPOSITIONS AND METHODS OF MAKING THE SAME

CROSS-REFERENCE TO RELATED APPLICATIONS

This application is a National Phase Application of PCT Application Serial No. PCT/US2018/035305, filed May 31, 2018, which claims priority to U.S. Ser. No. 62/547,349, filed Aug. 18, 2017, and EP Application No. 17196049.5, filed Oct. 12, 2017, herein incorporated by reference.

FIELD OF THE INVENTION

The present disclosure relates to butyl based compositions having a low transition glass temperature, and more particularly relates to hydrocarbon resins for butyl based compositions with low transition glass temperature to improve low temperature fatigue resistance without an increase in permeability.

BACKGROUND OF THE INVENTION

Aliphatic-aromatic based hydrocarbon resins are used in isobutylene based compositions to impart suitable filler dispersion and modify the range of mechanical and fatigue resistant properties of the composition without affecting the permeability characteristics. However, certain butyl based compositions comprise one or more polymers having a high softening point ("SP") and a high glass transition temperature ("Tg"). Therefore, adding such polymers increases the butyl based composition Tg, and the potential for cold cracking and decreasing cold temperature resistance in various applications. For example, isobutylene-isoprene based compositions are prone to crack at severe low temperature conditions (i.e., −35° C. to −40° C.) under tension-compression cyclic loadings. While additives can be added the butyl based composition to decrease the overall Tg, often an additive will increase the permeability coefficient of the composition, which is undesirable, especially for applications such as tire inner liners.

Under certain circumstances, the addition of a secondary polymer such as natural rubber, ethylene propylene rubbers or ethylene propylene diene monomer ("EPDM") can reduce Tg as well as the low temperature brittle point ("LTB") of the composition and impart low temperature flex fatigue resistance. Or, similarly, relative large amount of oils in the isobutylene based composition can increase the free volume of the polymer chains and cause a suppression of the Tg and LTB.

On the other hand, additives such as low molecular weight plasticizers can result in an increase in permeability coefficient, especially for applications such as tire inner liners. For example, a bromobutyl-natural rubber blend composition can result in more rapid air loss in a tire when compared to a 100% bromobutyl polymer blend based composition. Further, some isoprene based polymers, such as isobutylene co-para-methylstyrene based polymers, have improved permeability characteristics but also have higher glass transition temperatures than conventional isobutylene-isoprene based compositions. Therefore, these polymers pose serious concerns with respect to low temperature performance. While co-monomers such as para-methyl styrene with functionality in the side group can help in efficient packing of the chains and reduce permeability, efficient packing reduces the free volume of the polymer, thereby increases Tg.

To fully utilize the improvements in air barrier properties for applications such as tire inner liners, butyl based compositions with very low Tg and high cold temperature fatigue resistance are needed. Therefore, a need exists for reducing the Tg (and LTB) and improving cold temperature fatigue resistance of butyl based elastomer compositions without decreasing permeability or rheo-mechanical properties.

SUMMARY OF THE INVENTION

Provided herein are hydrocarbon resins comprising an aromatic H mole content between about 0% to about 10%; an olefin H mole content between about 0% to about 30%; and an aliphatic H content between about 70% to about 100%, and where the resin has a number average molecular weight between about 20 to about 500 g/mole, a weight average molecular weight between about 100 to about 2,000 g/mole, and a glass transition temperature between about 0° C. to about −80° C.

Methods of making the hydrocarbon resin are also provided comprising the steps of providing a hydrocarbon reaction product having a reaction temperature is between about 0° C. and about 30° C. The reaction product comprises: (a) at least one of trans-pentadiene-1,3, cyclopentene, cis-pentadiene, and mixtures thereof; (b) a cyclic pentadiene component selected from the group consisting of: cyclopentadiene, cyclopentadiene dimer, cyclopentadiene trimer, cyclopentadiene-$C_4$ codimer, cyclopentadiene-piperylene codimer, cyclopentadiene-methylcyclopentadiene codimer, methylcyclopentadiene, methylcyclopentadiene dimer, methylcyclopentadiene-$C_4$ codimer, methylcyclopentadiene-piperylene codimer, and mixtures thereof; and an aromatic component selected from the group consisting of styrene, ortho-methyl-styrene, meta-methyl-styrene, para-methyl-styrene, alpha-methyl-styrene, t-beta-methyl-styrene, indene, methyl indene, vinyl toluene, and combinations thereof. The reaction product is quenched with an isopropanol and water mixture and an aqueous layer is separated from the mixture. Paraffins are removed from the aqueous layer to produce the hydrocarbon resin having: an aromatic H mole content between about 0% to about 10%; an olefin H mole content is between about 0% to about 30%; an aliphatic H content between about 70% to about 100%; a number average molecular weight between about 10 to about 1000; a weight average molecular weight between about 50 to about 5000; and a glass transition temperature between about 0° C. to about −80° C.

The reaction product can be produced in a polymerization reactor with a Friedel-Crafts catalyst or Lewis Acid catalyst at a temperature between about 0° C. and about 100° C. The reaction product can comprise 10 to 20 wt. % of raffinate.

DESCRIPTION OF THE PREFERRED EMBODIMENTS

Figure 1A:
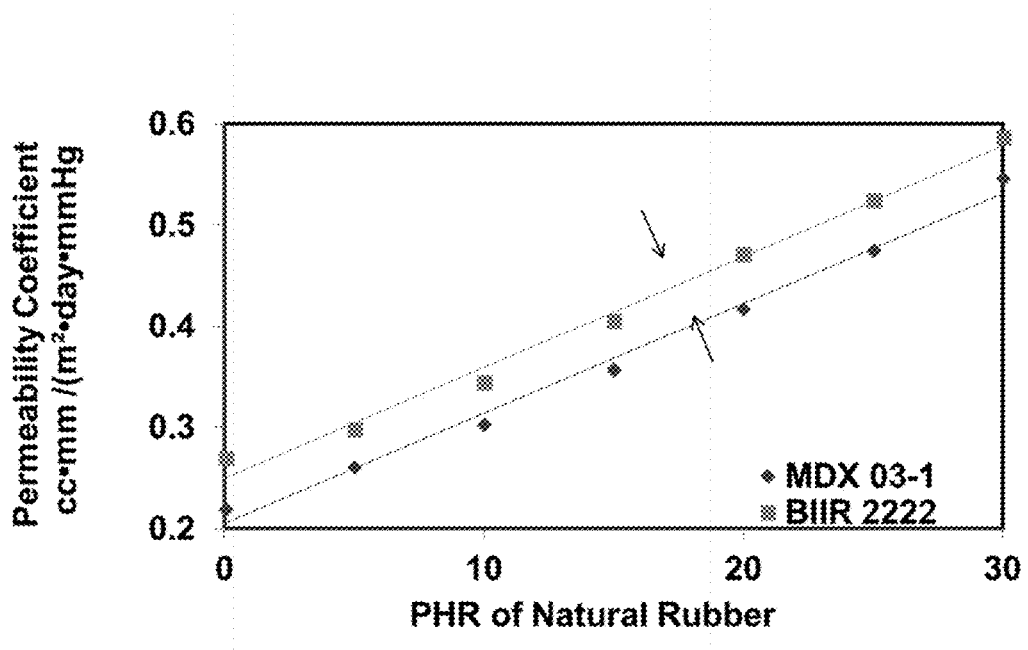
FIG. 1A shows the effect of varying natural rubber content on the permeability of 2 isobutylene-isoprene copolymer compositions.

Various specific embodiments, versions and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the term "elastomer" may be used interchangeably with the term "rubber" and refers to any composition comprising at least one elastomer.

The term "rubber" refers to any polymer or composition of polymers consistent with the ASTM D1566 definition: "a material that is capable of recovering from large deformations, and can be, or already is, modified to a state in which it is essentially insoluble (but can swell) in boiling solvent."

The term "vulcanized rubber" refers to a crosslinked elastic material compounded from an elastomer, susceptible to large deformations by a small force capable of rapid, forceful recovery to approximately its original dimensions and shape upon removal of the deforming force as defined by ASTM D1566.

The term "hydrocarbon" refers to molecules or segments of molecules containing primarily hydrogen and carbon atoms. In some molecules, hydrocarbon also includes halogenated versions of hydrocarbons and hydrocarbons containing heteroatoms.

The term "inert hydrocarbons" refers to piperylene, aromatic, styrenic, ameylene, cyclic pentadiene components, and the like, as saturated hydrocarbons or hydrocarbons which are otherwise essentially non-polymerizable in carbocationic polymerization systems, e.g., the inert compounds have a reactivity ratio relative to cyclopentadiene less than 0.01.

Aromatic, olefinic, and aliphatic hydrogen content of the hydrocarbon polymer modifiers were determined by proton nuclear magnetic resonance ("H-NMR").

The term "phr" refers to parts per hundred rubber and is a measure of the component of a composition relative to 100 parts by weight of the elastomer (rubber component) as measured relative to total elastomer. The total phr (or parts for all rubber components, whether one, two, three, or more different rubber components) is always defined as 100 phr. All other non-rubber components are a ratio of the 100 parts of rubber and are expressed in phr.

The term "polymer" refers to homopolymers, copolyomers, interpolymers, terpolymers, etc. Likewise, a copolymer refers to a polymer comprising at least two monomers, optionally with other monomers.

The term "copolymer" refers to random polymers of $C_4$ to $C_7$ isoolefins derived units and alkylstyrene. For example, a copolymer can contain at least 85 wt. % of the isoolefin, about 8 to about 12% by weight alkylstyrene, and about 1.1 to about 1.5 wt % of a halogen. For example, a copolymer can be a random elastomeric copolymer of a $C_4$ to $C_7$ alpha-olefin and a methylstyrene containing at about 8 to about 12 wt. % methylstyrene, and 1.1 to 1.5 wt. % bromine or chlorine. Alternatively, random copolymers of isobutylene and para-methylstyrene ("PMS") can contain from about 4 to about 10 mol % para-methylstyrene wherein up to 25 mol % of the methyl substituent groups present on the benzyl ring contain a bromine or chlorine atom, such as a bromine atom (para-(bromomethylstyrene)), as well as acid or ester functionalized versions thereof. Furthermore, copolymers can be substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from about 10 to about 22 mol % based on the total number of para-methylstyrene, and wherein the para-methylstyrene derived units are present from 8 to 12 wt % based on the total weight of the polymer or from 9 to 10.5 wt %. Also, for example, para-(halomethylstyrene) can be para-(bromomethylstyrene).

The term "alkyl" refers to a paraffinic hydrocarbon group which may be derived from an alkane by dropping one or more hydrogens from the formula, such as, for example, a methyl group ($CH_3$), or an ethyl group ($CH_3CH_2$).

The term "aryl" refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

The term "isoolefin" refers to a $C_4$ to $C_7$ compound and includes, but is not limited to, isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. An exemplary polymer can be obtained by reacting 92 to 99.5 wt. % of isobutylene with 0.5 to 8 wt. % isoprene, or reacting 95 to 99.5 wt. % isobutylene with from 0.5 to 5.0 wt. % isoprene.

The term "substituted" refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-dibromopropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene.

As used herein, the term "butyl based composition" is also sometimes referred to herein "butyl based elastomer composition," "butyl based polymer composition," "isobutylene based composition," "isobutylene based elastomer composition" and/or "isobutylene based polymer composition."

As used herein, the term "isobutylene based elastomer" may be used to refer to elastomers or polymers comprising a plurality of repeat units from isobutylene. The term "isobutylene based elastomer" or "isobutylene based polymer" refers to elastomers or polymers comprising at least 70 mole percent repeat units from isobutylene.

The term "rubber" includes, but is not limited to, at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Halogenated rubbers are also described in U.S. Pat. Nos. 4,703,091 and 4,632,963.

As used herein, "halogenated butyl rubber" refers to both butyl rubber and so-called "star-branched" butyl rubber, described below. The halogenated rubber can be a halogenated copolymer of a $C_4$ (as noted sometimes as "$C_4$") to $C_7$ (also noted sometimes as "$C_7$") isoolefin and a multiolefin. The halogenated rubber component can be a blend of a polydiene or block copolymer, and a copolymer of a $C_4$ to $C_7$ isoolefin and a conjugated, or a "star-branched" butyl polymer. The halogenated butyl polymer can be described as a halogenated elastomer comprising $C_4$ to $C_7$ isoolefin derived units, multi-olefin derived units, and halogenated multiolefin derived units, and includes both "halogenated butyl rubber" and so called "halogenated star-branched" butyl rubber.

As described herein, rubber can be a halogenated rubber or halogenated butyl rubber such as brominated butyl rubber or chlorinated butyl rubber. General properties and processing of halogenated butyl rubbers is described in THE VANDERBILT RUBBER HANDBOOK 105-122 (R. F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by E. Kresge and H. C. Wang in 8 KIRK-OTHMER ENCYCLOPEDIA OF CHEMICAL TECHNOLOGY 934-955 (John Wiley & Sons, Inc. 4th ed. 1993).

Halogenated butyl rubber can be produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a co-monomer mixture, the mixture having at least one (1) $C_4$ to $C_7$ isoolefin monomer component such as isobutylene with (2) a multiolefin, or conjugated diene, monomer component. The isoolefin is in a range from 70 to 99.5 wt. % of the total comonomer mixture, or 85 to 99.5 wt. %. The conjugated diene component is present in the comonomer mixture from 30 to 0.5 wt. % or from 15 to 0.5 wt. %. From 8 to 0.5 wt. % of the co-monomer mixture is conjugated diene.

Halogenated butyl rubber is produced by the halogenation of a butyl rubber product. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. The halogen can be in the so called II and III structures as discussed in, for example, RUBBER TECHNOLOGY at 298-299 (1995). The butyl rubber can be halogenated in hexane diluent at from 40 to 60° C. using bromine ($Br_2$) or chlorine ($Cl_2$) as the halogenation agent. The halogenated butyl rubber has a Mooney viscosity of from 20 to 70 (ML 1+8 at 125° C.), or from 25 to 55. The halogen content is from 0.1 to 10 wt. % based in on the weight of the halogenated butyl rubber or from 0.5 to 5 wt. %. The halogen wt. % of the halogenated butyl rubber is from 1 to 2.2 wt. %.

As used herein, EXXPRO™ refers to a brominated isobutylene-paramethylstyrene (BIMSM) rubber or isobutylene-co-para-methyl-styrene based elastomer, which is produced by catalytic polymerization of isobutylene and isoprene and manufactured by ExxonMobil and useful in a variety of consumer applications including tires and medical tube stoppers.

EXXPRO™ 3035 or EXXPRO 3035 refers to a brominated copolymer of isobutylene and paramethylstyrene having a specific gravity of 0.93, a Mooney Viscosity Target of 45 with minimum of 40 and maximum of 50, benzylic bromine, calcium, water and slow cure rate grade.

EXXPRO™ 3433 or EXXPRO 3433 refers to a brominated copolymer of isobutylene and paramethylstyrene having a specific gravity of 0.93, a Mooney Viscosity Target of 35 with minimum of 30 and maximum of 40, benzylic bromine, calcium, water and regular cure rate grade.

EXXPRO™ 3745 or EXXPRO 3745 refers to a brominated copolymer of isobutylene and paramethylstyrene having a specific gravity of 0.93, a Mooney Viscosity Target of 45 with minimum of 40 and maximum of 50, benzylic bromine, calcium, water and fast cure rate grade.

EXXPRO™ Bromobutyl or Bromobutyl refers to brominated isobutylene-isoprene rubber or BIIR manufactured by Exxon Mobil Chemical, a family of butyl rubbers used in a variety of consumer applications including tires and medical tube stoppers Bromobutyl 6222, also known as SBB 6222, refers to a brominated copolymer of isobutylene and isoprene having a specific gravity of 0.94; a Mooney Viscosity target of 32, minimum of 27, and a maximum of 37; a bromine composition target of 2.4%, a minimum of 2.2%, and a maximum of 2.6%; and a calcium composition target of 0.165%, a minimum of 0.135%, and a maximum of 0.195%.

Bromobutyl 2222, also known as BIIR 2222, refers to a brominated copolymer of isobutylene and isoprene having a specific gravity of 0.93; a Mooney viscosity target of 32, a minimum of 28, and a maximum of 36; a bromine composition target of 1.03%, a minimum of 0.93%, and a maximum of 1.13%; and a calcium composition target of 0.15%, a minimum of 0.12%, and a maximum of 0.18%.

Bromobutyl 2235 refers to a brominated copolymer of isobutylene and isoprene having a specific gravity of 0.93; a Mooney viscosity target of 39, a minimum of 35, and a maximum of 43; a bromine composition target of 1.03%, a minimum of 0.93%, and a maximum of 1.13%; a calcium composition target of 0.14%, a minimum of 0.11%, and a maximum of 0.17%, and regular cure rate grade.

Bromobutyl 2255 refers to a brominated copolymer of isobutylene and isoprene having a specific gravity of 0.93; a Mooney viscosity target of 46, a minimum of 41, and a maximum of 51; a bromine composition target of 1.03%, a minimum of 0.93%, and a maximum of 1.13%; a calcium composition target of 0.15%, a minimum of 0.12%, and a maximum of 0.18% and regular cure rate grade.

Bromobutyl 2211 is a brominated copolymer or isobutylene and isoprene having a specific gravity of 0.93; a Mooney Viscosity minimum of 28, and a maximum of 36; a bromine composition target of 1.08%, a minimum of 0.93%, and a maximum of 1.23%; a calcium composition target of 0.13%, a minimum of 0.09%, and a maximum of 0.17% and fast cure rate grade.

Bromobutyl 2244 is a brominated copolymer or isobutylene and isoprene having a specific gravity of 0.93; a Mooney viscosity target of 32, a minimum of 28, and a maximum of 36; a bromine composition target of 1.08%, a minimum of 0.93%, and a maximum of 1.23%; a calcium composition target of 0.13%, a minimum of 0.09%, and a maximum of 0.17% and fast cure grade.

Bromobutyl 7211 is a brominated copolymer or isobutylene and isoprene having a specific gravity of 0.93; a Mooney viscosity target of 32, a minimum of 28, and a maximum of 36; a bromine composition target of 1.08%, a minimum of 0.93%, and a maximum of 1.23%; a calcium composition target of 0.13%, a minimum of 0.10%, and a maximum of 0.16% and fast cure grade.

Bromobutyl 7244 is a brominated copolymer or isobutylene and isoprene having a specific gravity of 0.93; a Mooney viscosity target of 46, a minimum of 41, and a maximum of 51; a bromine composition target of 1.03%, a minimum of 0.93%, and a maximum of 1.13%; a calcium composition target of 0.17%, a minimum of 0.14%, and a maximum of 0.20% and slow cure grade.

EXXON™ Butyl refers to a copolymer of isobutylene and isoprene having a specific gravity of 0.92, and useful in a variety of consumer applications including tires and medical tube stoppers.

Butyl 065 refers to a copolymer of isobutylene and isoprene having a specific gravity of 0.92 and Mooney Viscosity Target of 32, Minimum of 29 and Maximum of 35, an antioxidant minimum of 0.03 and 0.3 wt. % of maximum volatiles.

Butyl 365 refers to a copolymer of isobutylene and isoprene having a specific gravity of 0.92 and Mooney Viscosity Target of 33 Minimum of 30 and Maximum of 36, an antioxidant minimum of 0.03 and 0.3 wt. % of maximum volatiles.

Butyl 068 refers to a copolymer of isobutylene and isoprene having a specific gravity of 0.92 and an antioxidant minimum of 0.03 and 0.3 wt. % of maximum volatiles.

Butyl 268 refers to a copolymer of isobutylene and isoprene having a specific gravity of 0.92, a Mooney Viscosity Target of 51, Minimum of 46 and Maximum of 46; an antioxidant minimum of 0.03 and 0.3 wt. % of maximum volatiles.

CHLOROBUTYL refers to chlorinated isobutylene-isoprene rubber or CIIR useful in a variety of consumer applications including tires and medical tube stoppers. CHLOROBUTYL is made from reacting butyl rubber with chlorine in a continuous process and provides an improved compression set and better resistance to heat, ozone, and flex fatigue. Other properties of CHLOROBUYTL include low permeability to air, gases, and moisture, vibration damping, low glass transition temperature, wide vulcanization versatility, fast cure rates, no nitrosamines or nitrosamines precursors, good adhesion and compatibility to other rubbers.

CHLOROBUTYL 1066 refers to an isobutylene-isoprene copolymer derived from reacting butyl rubber with chlorine in a continuous process having low permeability to gas, gases and moisture, vibration damping, low glass transition temperature, wide vulcanization versatility, good adhesion and compatibility to other rubbers.

ESCOREZ™ refers to petroleum hydrocarbon tackifiers or tackifier resins. There are two major families of this product line, the first has major components of $C_5$-$C_6$ olefins and diolefins (1000 and 2000 series) that are catalytically polymerized. The second family has major components that are polycyclodienes ($C_{10}$-$C_{12}$ Cyclodiene dimers plus dicyclopentadiene with or without $C_8$-$C_{10}$ vinyl aromatics) (5000 series) that are thermally polymerized. These resins can be used to enhance the tack properties of a variety of adhesive polymers. Applications for these resins include hot melt adhesives and pressure sensitive adhesives.

ESCOREZ™ E5000 refers to a petroleum hydrocarbon tackifier resin having polycyclodienes ($C_{10}$-$C_{12}$ cyclodiene dimers plus dicyclopentadiene with or without $C_8$-$C_{10}$ vinyl aromatics) as a major component which is thermally polymerized.

ESCOREZ™ 1102 refers to an aliphatic hydrocarbon resin having a softening point of 100° C., a melt viscosity of 1650 cP, a molecular weight-number average (Mn) of 1300 g/mol and a molecular weight-weight average (Mw) of 2900 g/mol useful to increase tack and adhesive properties and modify mechanical and optical properties of polymer blends and thermally polymerized.

ESCOREZ™ 2520 refers to a petroleum hydrocarbon tackifier resin having C5-C6 olefins and diolefins as major components and thermally polymerized.

SBC 5066 refers to a chlorinated copolymer of isobutylene and isoprene, including a styrene block copolymer branching agent useful in adhesives and sealants.

STRUKTOL™ 40 MS refers to a homogenizing agent by Struktol Company of America and a mixture of aromatic and aliphatic hydrocarbon resins designed to improve the homogeneity of elastomers and effective with elastomer blends which tend to crumble at the beginning of the mixing cycle. STRUKTOL™ 40 MS increases the greentack of some compounds, boosts the efficiency of other tackifying agents and has good solubility in aromatic and chlorinated hydrocarbon oils.

PROMIX™ 400 refers to a homogenizing resin of dark aliphatic, naphthenic, and aromatic hydrocarbon resins; an EVA copolymer; silicon dioxide; and magnesium silicate used to improve mold flow, extrusion characteristics, and the homogeneity of elastomers and fillers. PROMIX™ 400 can reduce nerve, shrinkage, mixing cycle time, energy consumption, and viscosity and enhance green tack.

CONTINEX™ Carbon Black N660 refers to a furnace grade carbon black compound manufactured by Continental Carbon Company and is both tire grade and mechanical rubber grade. CONTINEX™ Carbon Black N660 has the following specifications: iodine adsorption of 36 g/kg; oil absorption 90 10-5 m³/kg; oil absorption compressed of 74 10-5 m³/kg/NSA multipoint of 35 m²/g; STSA of 34 m²/g; pour density of 440 kg/m³; and a delta stress at 300% elongation of 02.3 MPa or −330 psi and is useful in carcass and innerliner functions for tires, medium reinforcing for innertubes, cable insulation, and body mounts for mechanical rubber.

Calsol-810 refers to a naphthenic oil manufactured by Calumet Specialty Products and is refined form a blend of naphthenic crudes using a multistage hydrogenation process, compatible with synthetic elastomers and their additives and designed to increase viscosity-gravity constants and aromatics levels, and lower aniline points. It exhibits high VGC levels and low aniline points. This compound can be used in a variety of compounds, including but not limited to adhesives, defoaming agents for paper and paperboard, defoaming agents used in coatings, textiles and textile fibers, resin bonded filers, animal glue defoamer, surface lubricants for the manufacture of metallic articles such as rolling foils and sheet stock, and rubber articles intended for repeated use. The specifications of Calsol-810 include a viscosity at 40° C. minimum of 18.70, maximum of 21.70; API gravity minimum of 23.5, maximum of 26.0; flash point minimum of 160° C.; Pour point maximum of −34° C.; aniline point minimum of 68.3° C. and maximum of 76.7° C.

MAGLITE™ K refers to a magnesium oxide compound manufactured by Hallstar designed to produce a lower activity product for applications where longer reaction time is required. MAGLITE™ K can be used in a wide variety of polymer applications including fluoroelastomers, butyl, chlorobutyl, chlorinated rubber, chlorosulfonated polyethylene, and nitrile. The specifications of MAGLITE™ K include a composition of 94.5% Magnesium Oxide, 1.0% calcium oxide, and 0.03% chloride; ignition loss of 4.0%; mean particle size of 2.0 microns; bulk density of 26 lb/ft$^3$; and a BET surface area of 40 m$^2$/g.

KADOX™ 911 refers to a zinc oxide manufactured by Horsehead Corporation and is a French process, high purity, very fine particle size zinc oxide. KADOX™ 911 is designed to provide a zinc oxide with high surface area and reactivity with minimum setting and opacity. In rubber, KADOX™ 911 is designed to provide high activating power and reinforcement with an accelerating effect. The specifications for KADOX™ 911 include a composition of zinc oxide 99.9%, cadmium oxide 0.005%, iron (III) oxide 0.001%, lead oxide 0.001%, and water soluble salts 0.02%; a mean surface particle diameter of 0.12 microns; a specific surface of 9.0 m$^2$/g; a specific gravity of 5.6; and an apparent density of 35 lb/ft$^3$.

ALTAX™ MBTS refers to mercaptobenzothiazole disulfide, is also referred to as benzothiazyl disulfide, manufactured by Vanderbilt Chemicals, LLC and useful in natural and synthetic rubbers as a primary accelerator and scorch-modifying secondary accelerator in NR and SBR copolymers, in neoprene G types as a retarder or plasticizer, and in W types as a cure modifier. ALTAX™ MBTS is moderately soluble in toluene and chloroform, insoluble in gasoline and water and is 94% benzothiazole disulfide and 5% white mineral oil. ALTAX™ MBTS includes an ash content of 0.7% maximum, a heat loss of 1.0% maximum, a melting range of 164° C. to 179° C., and a density at 20° C. of 1.54 Mg/m$^3$.

MISTRON™ HAR refers to a talc, an insoluble mineral of the magnesium silicate, and made by a delamination process designed to increase aspect ratio and result in a more lamellar talc produced by Imerys. MISTRON™ HAR is used as a reinforcing filler in partial replacement of carbon black in tire inner liners and has properties that restrict liquid and gas diffusion increasing the diffusion path and improving impermeability. MISTRON™ HAR can limit oxygen diffusion in the tire carcass preventing steel cord oxidation and improving durability. MISTRON™ HAR can improve scorch time, viscosity, and cut growth resistance.

LINPLAST™ 812 refers to a Di-C$_8$C$_{10}$C$_{12}$ alkyl phthalate fatty alcohol produced by Sasol and can be used as a plasticizer to provide thermal resistance and cold flexibility in elastomers, sealing compounds, and lubricants.

JAYFLEX refers to a plasticizer and substitute for Di (2-ethylhexyl) phthalate (DOP) in most flexible PVC applications.

BENZOFLEX TX 2088 refers to a high solvating plasticizer manufactured by Eastman useful in PVC, polyvinyl acetate, and water-based adhesive systems for flooring and interior surfaces, latex caulks, latex sealants, polysulfide sealants, pressure sensitive adhesives, PVAc water based adhesives, PVC plastisol sealant, and VAE water based adhesives. BENZOFLEX TX 2088 properties include a maximum acidity of 0.1%, a specific gravity of 1.16, a flash point of 202° C., and a viscosity of 71 mPas.

WINGTACK™ 10 refers to a liquid aliphatic C-$_5$ petroleum hydrocarbon resin manufactured by Cray Valley having low color and low specific gravity. WINGTACK™ 10 is used as tackifying resin of elastomers such as SIS, SBS, polyisoprene, butyl, EPDM, and SBR. It is generally soluble in solvents having low to medium polarity and design to improve low temperature properties of compounds. WINGTACK™ 10 properties include a molecular weight of 500 g/mole, a specific gravity of 0.90, and a viscosity of 30,000 cps.

Natural Rubber SMR-L refers to natural rubber, specifically standard Malaysian rubber of the L technical specifications which include: a dirt content <0.02, ash content <0.05, nitrogen content <0.60, volatile matter <0.50, plasticity retention index of 60%, a Wallace Rapid Plasticity minimum of 35.0.

Natural Rubber SMR-CV refers to natural rubber, specifically standard Malaysian rubber of the CV 60 technical specifications which include: a dirt content <0.02, ash content <0.05, nitrogen content <0.60, volatile matter <0.80, plasticity retention index of 60%.

Rubbermakers Sulfur OT refers to an oil treated grade of sulfur used to vulcanize rubber compounds having properties which include a sulfur purity of 99.0%, a heat loss of 0.15%, ash content of 0.10%, an acidity as H$_2$SO$_4$ of 0.01%, an oil treatment of 0.5%, and a specific gravity of 2.07.

Santicizer 711 refers to a compound of the composition of diundecyl benzene-1,2-dicarboxylate, also known as di(c7-9-11-alkyl) phthalate; 1,2-Benzenedicarboxylic acid; or Di-C7-9-11-akyl ester.

Dioctyl Terephthalate refers to bis(2-ethylhexyl) benzene-1,4-dicarboxylate, also known as Di(2-ethylhexyl)terephthalate, DOTP, or DEHT, a compound having the formula C6H4(CO2C8H17)2 and is a non-phthalate plasticizer useful for softening PVC plastics.

Bis 2 ethyl hexyl sebacate refers to bis(2-ethylhexyl) decanedioate, or dioctyl sebacate and useful as a plasticizer.

The present disclosure provides a butyl based composition comprising at least one low Tg liquid hydrocarbon resin, or mixtures of two or more hydrocarbon resins, or mixture of one or more low Tg hydrocarbon resins with high Tg hydrocarbon resins. As used herein, the low Tg liquid hydrocarbon resin is also referred to as a "hydrocarbon resin." The hydrocarbon resin is comprised of aliphatic and aromatic components, or a blend of the same in varying ratios, or a derivative.

The present hydrocarbon resin improves filler dispersion, aids as a processing aid to improve mixing efficiency, improves (increases) elongation and imparts excellent flex fatigue resistance properties to the composition. Typically, permeability characteristics are not affected by varying quantities of the present hydrocarbon resin.

Hydrocarbon resins are used in butyl based compositions to achieve a balance in mechanical and flex fatigue resistance properties. For example, prior art liquid resins (referred to herein as "homogenizing resins") have a molecular weight ("Mw") that varies from 100-100,000 g/mol., preferably 500-50,000 g/mol., and more preferably 1000-10,000 g/mol. Examples of prior art/homogenizing resin systems include (but are not limited to) STRUKTOL™ 40 MS (Struktol Inc.) and PROMIX™ 400 (Flow Polymers). One disadvantage of prior art homogenizing resin is the high resin Tg. Typically, prior art homogenizing resins have high softening points between ~80° C. to 150° C. and Tg between 30° C. to 100° C., resulting in a butyl based composition with a high Tg (and LTB) and decreased low temperature flex fatigue resistance. On the other hand, the Tg (or LTB) of the butyl polymers (such as bromobutyl) is an intrinsic property and the polymer Tg cannot be altered unless a change in the molecular structure is created.

On the other hand, the present hydrocarbon resin has a number average molecular weight ("Mn") between 10 and 1000, preferably between 20 and 500, and more preferably between 50 and 300; and a weight average molecular weight ("Mw") between 50 and 5000, preferably between 100 and 2000, and more preferably between 200 and 1000. The properties of an exemplary hydrocarbon resin (as measured by gel permeation chromatography ("GPC")) is compared to a prior art resin in Table 1 below.

Mw, Mn, and MWD was measured by the test method described herein. The molecular weight was measured using Tosoh EcoSEC HLC-8320GPC instrument with enclosed Refractive Index (RI) Ultraviolet and (UV) detectors. The instrument was controlled and molecular weight was calculated using EcoSEC Workstation (Version 1.11) software. 4 columns (PLgel 5 am 500Å; 5 μm 500Å; 5 μm 10E3Å; 5 μm Mixed-D) were connected in series for effective separation. A sample was prepared by dissolving 24 mg (+/–1 mg) of hydrocarbon resin in 9 mL of tetrahydrofuran (THF) solution. The sulfur/THF solution (having a ratio of 1 mL sulfur solution per 100 mL THF solvent) was used as flow marker, for measurement of molecular weight. The dissolved sample was filtered using 0.45 mm syringe filter. The GPC calibration was done using a series of selected polystyrene standards that are of narrow molecular weights and cover the molecular weight range of the columns respective range of separation.

Further, the aromatic H mole content of the present hydrocarbon resin is 0-10%, preferably between 0-7%, and more preferably between 0-5%; the olefin H mole content is 0-30%, preferably between 0-20%, and more preferably between 5-15%; the aliphatic H mole content is 70-100%, preferably between 75-95%, and more preferably between 80-90%. An example of the composition of the resin (as measured by proton nuclear magnetic resonance ("H NMR")) is shown above in Table 1.

Aromatic H mole content, olefin H mole content, and aliphatic H mole content was determined by the test method described herein. 500 MHz Aglient or Bruker Pulsed Fourier Transforms Nuclear Magnetic resonance Spectrometer (FT-NMR) was used for measurement of aromaticity. The 1HNMR data is used to determine the percentage of aromatic, olefinic and aliphatic protons. Samples are prepared by dissolving 20(+/–1) mg of sample in 2.5 ml of deuterated tetrachloroethane. The percentage of aromatic, olefinic, and aliphatic protons was obtained by normalizing the total integral area of aliphatic, olefinic, and aromatic to 100.

The glass transition (Tg) of the present hydrocarbon resin (as measured by differential scanning calorimetry ("DSC"), as measured by the test method described herein) is between 0° C. and –80° C., preferably between –10° C. and –75° C., and more preferably between –15° C. and –60° C. 8(+/–1 mg) of the sample was weighed and introduced in an aluminum pan. A cover was placed on the pan and sealed with a press. The sample was conditioned by one heating and cooling cycle as described. Sample was heated from 25° C. to 80° C. at a rate of 20° C./min followed by a 1 min hold at 80° C. (first heating cycle). The sample was cooled from 80° C. to –100° C. at a rate of 10° C./min followed by 5 minute hold at –100° C. (first cooling cycle). The Tg of resin is measured by again heating the sample from –100° C. to 80° C. at a rate of 20° C./min (second heating cycle). The glass transition temperature reported is the midpoint of step change when heated during the second heating cycle.

As described herein, the Tg (or LTB) of the present butyl based composition is a function of the Tg of the individual components (as per the Flory-Fox equation) and can be altered by changing the formulation. To maintain cold temperature flex properties, the butyl based composition Tg (or LTB) is then reduced without increasing permeability coefficient.

Generally, the present butyl based compositions comprise a primary polymer. The present butyl based composition can also include a secondary polymer, a tackifier resin, stearic acid, an anti-scorch agent, process oil, and a filler. The butyl based composition can also include a curative package. An exemplary butyl based composition is set out in Table 2 below.

TABLE 1

PROPERTIES OF THE PRESENT HYDROCARBON RESIN COMPARED TO PRIOR ART/HOMOGENIZING RESIN

| Property | Units | Exemplary Hydrocarbon Resin | Homogenizing Resin STRUKTOL ™ 40 MS |
|---|---|---|---|
| Mn | g/mole | 180 | 1030 |
| Mw | g/mole | 490 | 4000 |
| MWD |  | 2.7 | 4 |
| Aromatic H Content | Mole. % | 2.11 | 7.67 |
| Olefinic H Content | Mole. % | 11.33 | 0.01 |
| Aliphatic H Content | Mole. % | 86.86 | 92.32 |
| Tg | ° C. | –53 | 50 |

TABLE 2

EXEMPLARY ISOBUTYLENE BASED ELASTOMER COMPOSITION

| Component | Phr |
|---|---|
| Primary + Secondary Polymer | 100 |
| Fillers (N660) | 60 |
| Process Oil (Napthenic Oil) | 8 |
| Homogenizing Resin (STRUKTOL ™ 40 MS) | 7 |
| Tackifier Resin (ESCOREZ ™ 1102) | 4 |
| Stearic Acid | 1 |
| Anti Scorch (MgO) | 0.15 |
| Non Productive (NP) Batch | 180.15 |
| Curative 1 (ZnO) | 1 |

TABLE 2-continued

EXEMPLARY ISOBUTYLENE BASED ELASTOMER COMPOSITION

| Component | Phr |
|---|---|
| Accelerator (MBTS) | 1.25 |
| Curative 2 (Sulfur) | 0.5 |
| Final Batch | 182.9 |

The primary polymer (also referred to as "the polymer") described herein is at least one isobutylene based polymer, homo-polymers, copolymers, blends of the same, or blends of primary polymer with other secondary polymers. Examples of a primary polymer include isobutylene-isoprene elastomers such as butyl ("IIR"), halogenated elastomers such as bromobutyl ("BIIR"), chlorobutyl ("CIIR"), star branched bromobutyl ("SBB"), and star branched chlorobutyl ("SBC"). Isobutylene copolymers include isobutylene polymerized with co-monomers other than isoprene and include, for example, isobutylene-co-para-methyl styrene copolymers and halogenated versions of the same such as EXXPRO™. Table 3 provides exemplary primary polymers and associated properties.

As the primary polymer or secondary polymer, the halogenated butyl or star-branched butyl rubber can be halogenated such that the halogenation is primarily allylic in nature. This can be achieved as a free radical bromination or free radical chlorination, or by such methods as secondary treatment of electrophilically halogenated rubbers, such as by heating the rubber, to form the allylic halogenated butyl and star-branched butyl rubber. Exemplary methods of forming the allylic halogenated polymer are disclosed by Gardner et al., in U.S. Pat. Nos. 4,632,963, 4,649,178, and 4,703,091. Thus, the halogenated butyl rubber can be halogenated in multi-olefin units which are primary allylic halogenated units, and wherein the primary allylic configuration is present to at least 20 mole percent (relative to the total amount of halogenated multi-olefin).

Star-branched halogenated butyl rubber ("SBHR") is a composition of a butyl rubber, either halogenated or not, and a polydiene or block copolymer, either halogenated or not. This halogenation process is described in detail in U.S. Pat. Nos. 4,074,035, 5,071,913, 5,286,804, 5,182,333 and 6,228,978. The secondary polymer is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

The SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt. %, greater than 0.3 wt. %, or from 0.3 to 3 wt. % or from 0.4 to 2.7 wt. %.

A commercial SBHR is Bromobutyl 6222 (ExxonMobil Chemical Company), having a Mooney viscosity (ML 1+8 at 125° C., ASTM 1646, modified) of from 27 to 37, and a bromine content of from 2.2 to 2.6 wt. % relative to the SBHR. Further, cure characteristics of Bromobutyl 6222 are as follows: MH is from 24 to 38 dNm, ML is from 6 to 16 dNm (ASTM D2084, modified)

An exemplary halogenated butyl rubber is Bromobutyl 2222 (ExxonMobil Chemical Company). Its Mooney viscosity is from 27 to 37 (ML 1+8 at 125° C., ASTM 1646, modified), and the bromine content is from 1.8 to 2.2 wt. % relative to the Bromobutyl 2222. Further, cure characteristics of Bromobutyl 2222 are as follows: MH is from 28 to 40 dNm, ML is from 7 to 18 dNm (ASTM D2084, modified). Another commercial available halogenated butyl rubber used as the secondary polymer is Bromobutyl 2255 (ExxonMobil Chemical Company). Its Mooney viscosity is from 41 to 51 (ML 1+8 at 125° C., ASTM 1646, modified), and the bromine content is from 1.8 to 2.2 wt. %. Further, cure characteristics of Bromobutyl 2255 are as follows: MH is from 34 to 48 dNm, ML is from 11 to 21 dNm (ASTM D2084, modified). The hydrocarbon resin described herein is not limited to the commercial source of any of the halogenated rubber.

Cure properties were measured using a MDR 2000 and 0.5 degree arc or an ODR 2000 and 3 degree arc at the indicated temperature, according to ASTM D2084. Test specimens were cured at the indicated temperature, typically from 150° C. to 160° C., for a time corresponding to t90+appropriate mold lag. The values "MH" and "ML" used here and throughout the description refer to "maximum torque" and "minimum torque", respectively. The "MS" value is the Mooney scorch value, the "ML (1+4)" value is the Mooney viscosity value. The error ($2\sigma$) in the later measurement is ±0.65 Mooney viscosity units. The values of "t" are cure times in minutes, and "ts" is scorch time" in minutes.

When possible, standard ASTM tests were used to determine the cured compound physical properties (see Table 1). Stress/strain properties (tensile strength, elongation at break, modulus values, energy to break) were measured at room temperature (about 23° C.) using an Instron 4204 or an Instron Series IX Automated Materials Testing System 6.03.08. Tensile measurements were done at ambient temperature on specimens (dog-bone shaped) width of 0.25 inches (0.62 cm) and a length of 1.0 inches (2.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported. The error ($2\sigma$) in Tensile strength measurements is ±0.47 MPa units. The error ($2\sigma$) in measuring 100% Modulus is ±0.11 MPa units; the error ($2\sigma$) in measuring Elongation at break is ±13% units. Shore A hardness was measured at room temperature (about 23° C.) by using a Zwick Duromatic according to ASTM D2240. Modulus was measured according to ASTMD412 die C.

Oxygen permeability was measured using a MOCON OxTran Model 2/61 operating under the principle of dynamic measurement of oxygen transport through a thin film as published by Pasternak et al. in JOURNAL OF POLYMER SCIENCE: PART A-2, P 467 (1970). The units of measure are cc-mm/m$^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Permeability was tested by the following method. Thin, vulcanized test specimens (0.4 mm±0.05 mm) from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\sigma$) in measuring air permeability is ±0.245 ($\times 10^8$) units.

strength, modulus and toughness). Addition of a filler or combination of fillers can assist in significantly reducing the butyl based composition permeability. However, increased amounts of filler can result in poor fatigue resistance and crack properties. Specific fillers include carbon black, silica, silicates, calcium carbonate, clays (low and high aspect ratio), mica, aluminum oxide, starch, or mixtures thereof. Furthermore, the fillers may be intercalated, exfoliated, layered, functionalized or pre-treated with certain chemicals in some cases. In some cases, the filler can be pre-mixed with the primary or secondary polymer, or their combination, and introduced as a masterbatch into the composition. The butyl based composition comprises fillers (or a combi-

TABLE 3

EXEMPLARY ISOBUTYLENE BASED POLYMERS

| Elastomer Grade | Mooney Viscosity (ML1 + 8 @ 125° C.) | Isoprene (mol. %) | Para-Methylstyrene (wt. %) | Halogen | Halogen (wt. %) | Halogen (mol. %) |
| --- | --- | --- | --- | --- | --- | --- |
| BUTYL065 | 32 | 1.05 | — | — | — | — |
| (low viscosity) 365 | 33 | 2.30 | — | — | — | — |
| BUTYL068 | 51 | 1.15 | — | — | — | — |
| (medium viscosity) 268 | 51 | 1.70 | — | — | — | — |
| CHLORO-BUTYL1066 | 38 | 1.95 | — | Cl | 1.26 | — |
| BROMO-BUTYL2222 | 32 | 1.70 | — | Br | 2.00 | — |
| BROMO-BUTYL2235 | 39 | 1.70 | — | Br | 2.00 | — |
| BROMO-BUTYL2255 | 46 | 1.70 | — | Br | 2.00 | — |
| BROMO-BUTYL2211 | 32 | 1.70 | — | Br | 2.10 | — |
| BROMO-BUTYL2244 | 46 | 1.70 | — | Br | 2.10 | — |
| BROMO-BUTYL7211 | 32 | 1.70 | — | Br | 2.00 | — |
| BROMO-BUTYL 7244 | 46 | 1.7 | — | Br | 2.00 | — |
| SBB6222 | 32 | 1.70 | — | Br | 2.40 | — |
| SBC5066 | 32 | — | — | Cl | 1.26 | — |
| EXXPRO ™ 3035 | 45 | — | 5.00 | Br | — | 0.47 |
| EXXPRO ™ 3433 | 35 | — | 5.00 | Br | — | 0.75 |
| EXXPRO ™ 3745 | 45 | — | 7.50 | Br | — | 1.20 |
| EXXPRO ™ 03-1 | 35 | — | 10.00 | Br | — | 0.80 |

Primary polymers can be solution mixed, melt mixed, solid state mixed or reactor mixed blends of two or more of the above elastomers. The isobutylene based composition can comprise of primary polymers from 30 to 100 phr, or from 50 to 100 phr, or from 70 to 100 phr.

The butyl based composition can also include secondary polymers. Secondary polymers include, but are not limited to, natural rubber ("NR"), cis-polyisoprene ("IR"), solution and emulsion styrene butadiene rubber ("s-SBR" and "e-SBR"), ethylene propylene diene rubber ("EPDM"). The secondary polymer can include derivatives and functionalized variations of polymer, and solution mixed, melt mixed, solid state mixed or reactor mixed blends of two or more of the above mentioned primary and secondary elastomers and their derivatives. The butyl based composition comprises a secondary polymer (or a combination of their blends) from 0 to 70 phr, from 0 to 50 phr, and from 0 to 30 phr. The total of the primary and secondary polymer is 100 phr.

The butyl based composition can also include at least one filler or multiple fillers. Fillers are used for imparting sufficient green strength to the compound to enable smooth processing, and for achieving the required balance of mechanical properties in the cured compounds (high nation of fillers) from 0 to 100 phr, from 20 to 90 phr, and from 30 to 80 phr. The inorganic fillers (type and amount) do not affect the Tg.

Figure 2A:
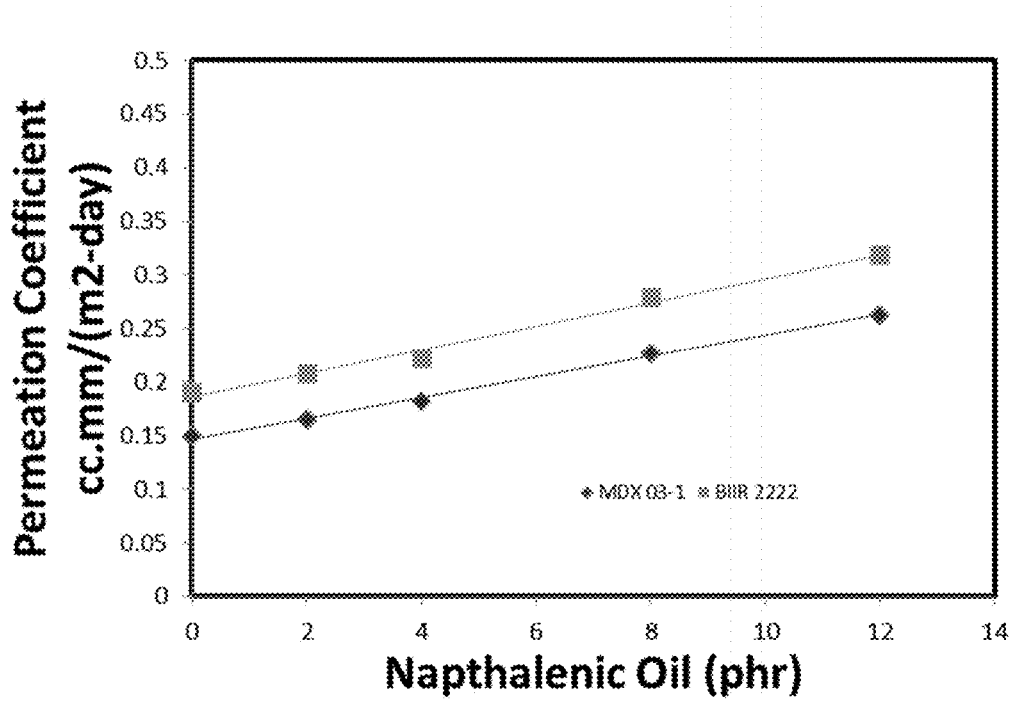
FIG. 2A shows the effect of varying napthalenic oil content on the permeability of 2 isobutylene-isoprene copolymer compositions
Figure 2B:
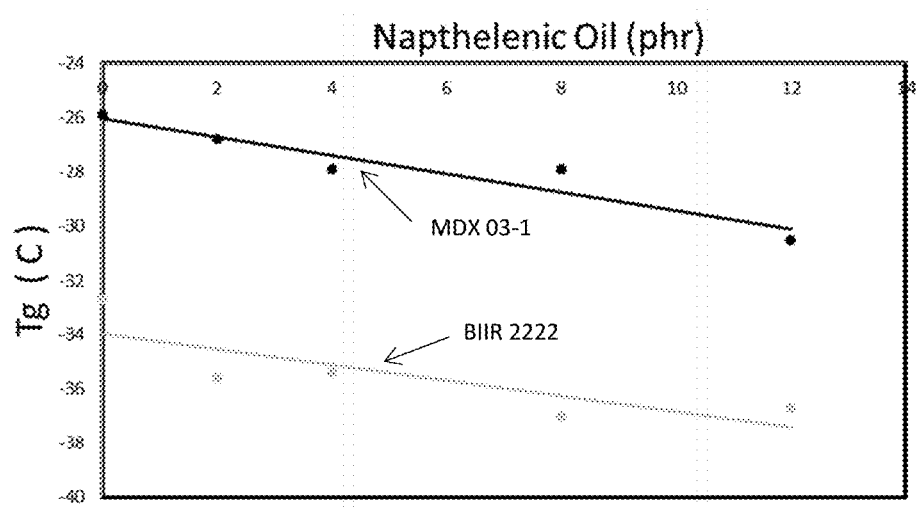
FIG. 2B shows the effect of varying napthalenic oil content on the Tg (and LTB) of 2 isobutylene-isoprene copolymer compositions.
Figure 3A:
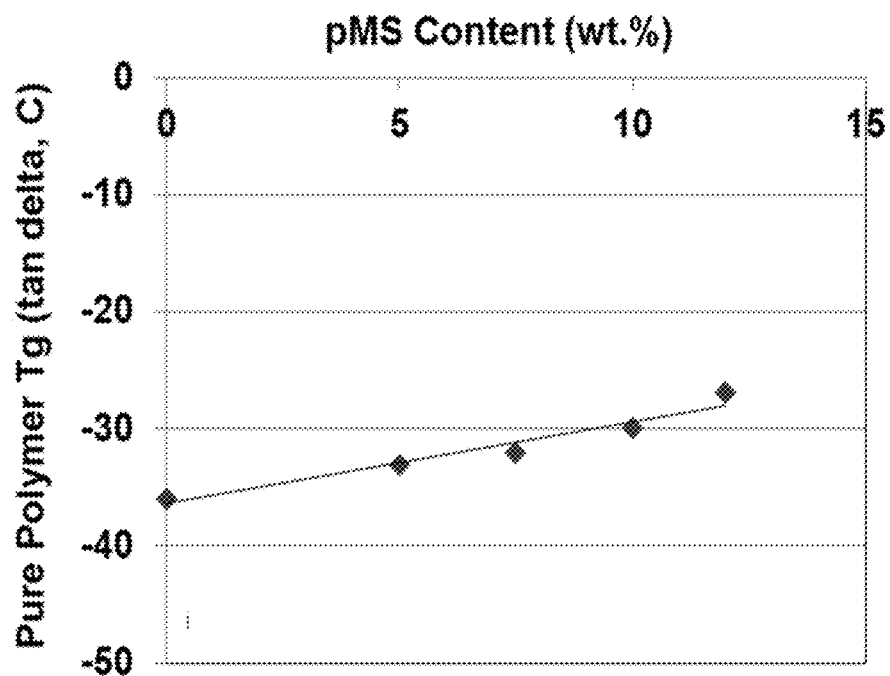
FIG. 3A shows polymer Tg dependence on pMS level.
Figure 3B:
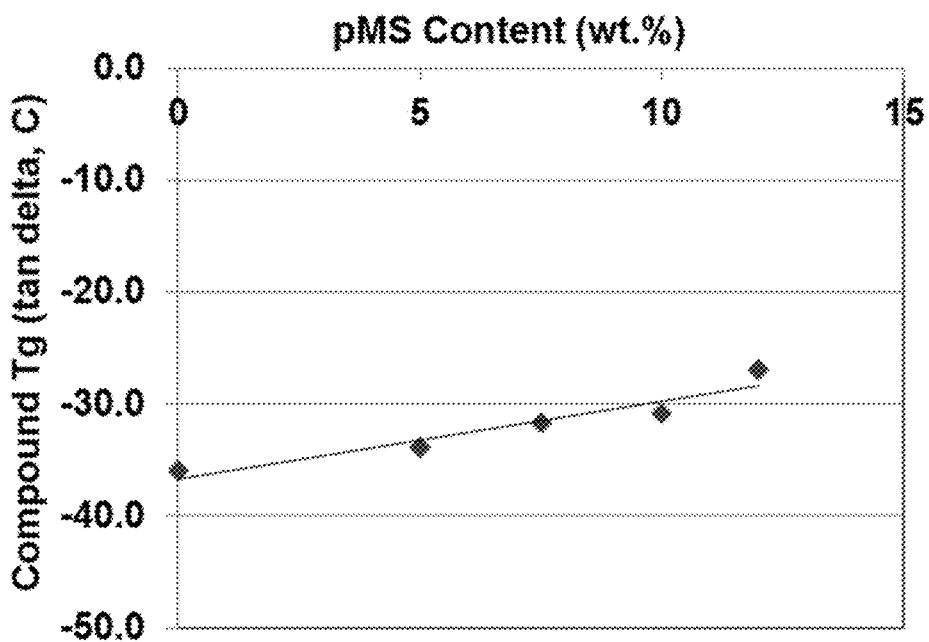
FIG. 3B shows composition Tg dependence on pMS level.

The butyl based composition also includes process oil, or blends of two or more process oils. The presence of oil aids in processing the polymer during mixing. The addition of oil increases the mixing time by reducing the compound temperature. Typically, the molecular weight of oils is low. Therefore, the oil also acts as a plasticizer by increasing the free volume and decreasing the overall compound Tg. For example, addition of naphthalenic oil has been shown to decrease the Tg (and LTB) of isobutylene based innerliner compounds. However, the addition of oil has also been shown to increase the permeability coefficient, which is undesirable for butyl based composition for inner liner applications. FIGS. 2A and 2B show the effect of varying amounts of naphthalenic oil on Tg (and LTB) and permeability properties of two butyl based compositions. The effect of varying amounts of naphthalenic oil on other butyl based compositions are shown in Table 4A and 4B below:

TABLE 4A

EFFECT OF VARYING THE PROCESS OIL CONTENT ON ISOBUTYLENE-ISOPRENE AND ISOBUTYLENE CO-PARA-METHYL STYRENE CO-POLYMER COMPOSITIONS, FIRST SET OF COMPOSITIONS

| Formulation | | 4A-1 | 4A-2 | 4A-3 | 4A-4 | 4A-5 |
|---|---|---|---|---|---|---|
| BROMOBUTYL 2222 | Phr | 100 | 100 | 100 | 100 | 100 |
| N660 | Phr | 60 | 60 | 60 | 60 | 60 |
| Naphthenic Oil | Phr | 0 | 2 | 4 | 8 | 12 |
| STRUKTOL ™ 40 MS | Phr | 7 | 7 | 7 | 7 | 7 |
| ESCOREZ ™ 1102 | Phr | 4 | 4 | 4 | 4 | 4 |
| Stearic Acid | Phr | 1 | 1 | 1 | 1 | 1 |
| MgO | Phr | 0.15 | 0.15 | 0.15 | 0.15 | 0.15 |
| EXXPRO ™ 03-1 | Phr | | | | | |
| NP Batch | Phr | 172.15 | 174.15 | 176.15 | 180.15 | 184.15 |
| Zinc Oxide | Phr | 1 | 1 | 1 | 1 | 1 |
| MBTS | Phr | 1.25 | 1.25 | 1.25 | 1.25 | 1.25 |
| Sulfur | Phr | 0.5 | 0.5 | 0.5 | 0.5 | 0.5 |
| Final Batch | Phr | 174.9 | 176.9 | 178.9 | 182.9 | 186.9 |
| Compound Properties | | | | | | |
| ML (1 + 4) | [MU] | 71.5 | 66 | 62 | 53.5 | 46.7 |
| MDR times by 10's | | | | | | |
| Test Time | [Min] | 15 | 15 | 15 | 15 | 15 |
| Test Temp | [° C.] | 180 | 180 | 180 | 180 | 180 |
| Osc. angle | [Deg.] | 0.5 | 0.5 | 0.5 | 0.5 | 0.5 |
| MH − ML | [dNm] | 5.12 | 4.84 | 4.46 | 4.02 | 3.62 |
| ts2 | [Min] | 2.09 | 2.16 | 2.21 | 2.47 | 2.54 |
| t90 | [Min] | 4.54 | 4.47 | 4.23 | 4.55 | 4.34 |
| Green Strength | | | | | | |
| PeakStress | [MPa] | 0.326 | 0.281 | 0.267 | 0.227 | 0.204 |
| StrnAtPeak | [%] | 62 | 65 | 63 | 69 | 64 |
| Hardness | | | | | | |
| Hardness | Zwick [Shore A] | 44 | 42 | 40 | 39 | 35 |
| Tensile Properties | | | | | | |
| 100Modulus | [MPa] | 1.382 | 1.235 | 1.179 | 0.989 | 0.85 |
| 300Modulus | [MPa] | 4.311 | 3.987 | 3.67 | 3.068 | 2.504 |
| StressAtBreak | [MPa] | 10.597 | 10.128 | 9.781 | 9.65 | 8.651 |
| % StrainAtBreak | [%] | 770 | 750 | 744 | 795 | 793 |
| Permeability | | | | | | |
| Permeability Coefficient | cc · mm/(m² · day · mmHg) | 0.190 | 0.208 | 0.222 | 0.280 | 0.319 |

TABLE 4B

EFFECT OF VARYING THE PROCESS OIL CONTENT ON ISOBUTYLENE-ISOPRENE AND ISOBUTYLENE CO-PARA-METHYL STYRENE CO-POLYMER COMPOSITIONS, FIRST SET OF COMPOSITIONS

| Formulation | | 4B-1 | 4B-2 | 4B-3 | 4B-4 | 4B-5 |
|---|---|---|---|---|---|---|
| BROMOBUTYL 2222 | phr | | | | | |
| N660 | phr | 60 | 60 | 60 | 60 | 60 |
| Naphthenic Oil | phr | 0 | 2 | 4 | 8 | 12 |
| STRUKTOL ™ 40 MS | phr | 7 | 7 | 7 | 7 | 7 |
| ESCOREZ ™ 1102 | phr | 4 | 4 | 4 | 4 | 4 |
| Stearic Acid | phr | 1 | 1 | 1 | 1 | 1 |
| MgO | phr | 0.15 | 0.15 | 0.15 | 0.15 | 0.15 |
| EXXPRO ™ 03-1 | phr | 100 | 100 | 100 | 100 | 100 |
| NP Batch | phr | 172.15 | 174.15 | 176.15 | 180.15 | 184.15 |
| Zinc Oxide | phr | 1 | 1 | 1 | 1 | 1 |
| MBTS | phr | 1.25 | 1.25 | 1.25 | 1.25 | 1.25 |
| Sulfur | phr | 0.5 | 0.5 | 0.5 | 0.5 | 0.5 |
| Final Batch | phr | 174.9 | 176.9 | 178.9 | 182.9 | 186.9 |

TABLE 4B-continued

EFFECT OF VARYING THE PROCESS OIL CONTENT ON ISOBUTYLENE-
ISOPRENE AND ISOBUTYLENE CO-PARA-METHYL STYRENE CO-
POLYMER COMPOSITIONS, FIRST SET OF COMPOSITIONS

| Formulation | | 4B-1 | 4B-2 | 4B-3 | 4B-4 | 4B-5 |
|---|---|---|---|---|---|---|
| Compound Properties | | | | | | |
| ML (1 + 4) | [MU] | 76.9 | 69.7 | 63.6 | 55.8 | 48.2 |
| MDR times by 10's | | | | | | |
| Test Time | [Min] | 15 | 15 | 15 | 15 | 15 |
| Test Temp | [° C.] | 180 | 180 | 180 | 180 | 180 |
| Osc. angle | [Deg.] | 0.5 | 0.5 | 0.5 | 0.5 | 0.5 |
| MH − ML | [dNm] | 8.47 | 7.97 | 7.48 | 7.48 | 6.34 |
| ts2 | [Min] | 2.66 | 2.84 | 2.84 | 3.11 | 3.21 |
| t90 | [Min] | 7.52 | 7.6 | 7.57 | 8.49 | 7.63 |
| Green Strength | | | | | | |
| PeakStress | [MPa] | 0.417 | 0.375 | 0.324 | 0.281 | 0.243 |
| StrnAtPeak | [%] | 64 | 63 | 65 | 66 | 63 |
| Hardness | | | | | | |
| Hardness | Zwick [Shore A] | 52 | 51 | 51 | 48 | 46 |
| Tensile Properties | | | | | | |
| 100Modulus | [MPa] | 2.818 | 2.252 | 2.077 | 2.119 | 1.658 |
| 300Modulus | [MPa] | 7.776 | 6.68 | 5.979 | 6.009 | 4.741 |
| StressAtBreak | [MPa] | 10.49 | 10.018 | 9.45 | 9.078 | 8.54 |
| % StrainAtBreak | [%] | 564 | 609 | 624 | 588 | 668 |
| Permeability | | | | | | |
| Permeability Coefficient | cc · mm/(m² · day · mmHg) | 0.150 | 0.165 | 0.182 | 0.228 | 0.263 |

For present butyl based compositions, useful process oils include paraffinic oils, naphthalenic oils, treated distillate aromatic extracts ("TDAE"), methyl-ethyl-ketone oils ("MEK"), poly-alpha-olefins ("PAO"), hydrocarbon fluid additives ("HFA"), polybutene oils ("PB"), or mixtures thereof. The amount of process oil (or a combination of fillers) in the present butyl based compositions comprise from 0-20 phr, preferably from 0-14 phr, and more preferably from 0-8 phr.

The present butyl based composition can further comprise a plasticizer including (but is not limited to) sebacates, adipates, phthalates, tallates, or benzoates, to impart improved cold temperature properties (and improved freeze resistance) to rubber compounds by decreasing the compound Tg (and LTB). The plasticizer increases chain spacing, thereby increasing the free volume of the polymer, thereby decreasing the compound Tg (and LTB). However, addition of a plasticizer can increase the permeability coefficient, which is undesirable for compositions used in inner liner applications.

As described herein, isobutylene based compositions are often limited by low green strength (during processing), difficulty mixing, presence of blisters during sheeting, low tack (to the carcass), low carcass adhesion, low self-to-self adhesion, high Tg (and LTB) and poor low temperature fatigue resistance. The addition of sufficient amounts of a secondary polymer (such as natural rubber) can mitigate these problems. For example, addition of natural rubber can decrease the Tg (and LTB) of isobutylene based compositions described herein. However, the addition of natural rubber can also increase the permeability coefficient, which is undesirable for inner liner butyl based compositions.

Hydrocarbon resins of the present butyl based compositions can be produced by different processes and are not limited to any one manufacturing methodology. However, in one process, present hydrocarbon resins are made by combining the feed streams described below in a polymerization reactor with a Friedel-Crafts or Lewis Acid catalyst at a temperature between 0° C. and 200° C. (generally around 20° C. to 30° C.). The feed streams comprise raffinates of the ESCOREZ™ E5000 process. Friedel-Crafts polymerization is generally accomplished by use of known catalysts in a polymerization solvent, and the solvent and catalyst may be removed by washing and distillation.

This polymerization process may be batch wise or continuous mode. Continuous polymerization may be accomplished in a single stage or in multiple stages. Nonaromatic components can include recycle feed stream of the chemical plant. The component of the feed streams are generally a synthetic mixture of cis-1, 3-pentadiene, trans-1, 3-pentadiene, and mixed 1, 3-pentadiene. In general, feed components do not include branched C5 diolefins such as isoprene. The feed component may be supplied in one embodiment as a mixed distillate cut or synthetic mixture comprising up to 20 wt. % cyclopentadiene or dimer of cyclopentadiene up to 30 wt. % of other components, such as, for example, 10-20 wt. % cyclopentene, 10-20 wt. % inert hydrocarbons, and optionally relatively minor amounts of one or more other olefins and diolefins such as methyl-cyclopentadiene or dimer or trimers of methyl-cyclopentadiene, and the like.

Petroleum fractions containing aliphatic C5 to C6 linear, branched, alicyclic mono-olefins, diolefins, and alicyclic C10 diolefins can be polymerized. The aliphatic olefins can comprise one or more natural or synthetic terpenes, preferably one or more of alpha-pinenne, dipentene, limonene or isoprene dimers. C8-C12 aromatic/olefinic streams containing styrene, vinyl toluene, indene, or methyl-indene can also be polymerized as such or in mixture with the aliphatic streams. After the polymerization is complete the reaction product is quenched with isopropanol and water mixture.

The aqueous layer is then separated from the reaction product using a separating funnel. The reaction product can contain several non-polymerizable molecules/paraffins. These are separated from the polymerized hydrocarbon resin by steam stripping at 250° C. The resin yield is ~31%.

The effect of various components of Tg of the butyl based composition are provided in Table 5 below.

TABLE 5

EFFECT OF COMPONENTS ON THE TG AND PERMEABILITY OF ISOBUTYLENE-ISOPRENE COMPOSITIONS

| Ingredient | Effect on Tg | Effect on Permeability |
| --- | --- | --- |
| Primary Polymer | Fixed | Fixed |
| Secondary Polymer | Decreases (+) | Increases (−) |
| Fillers | No effect | Decreases (+) |
| Process Oils | Decreases (+) | Increases (−) |
| Homogenizing Resin | Increases (−) | No effect |
| Tackifier resin | Increases (−) | No effect |
| Stearic Acid | No effect | Increases (−) |
| Curative Package | No effect | No effect |

Figure 4A:
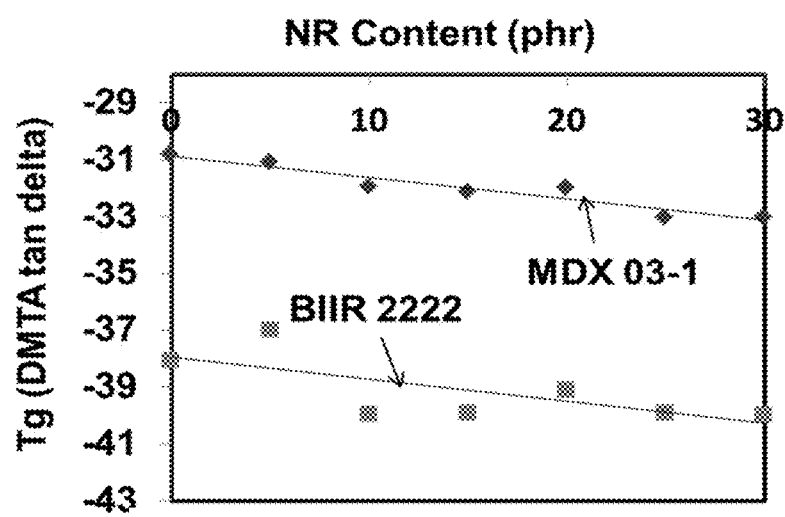
FIGS. 4A and 4B show the effect of varying natural rubber content on inner liner compositions Tg and LTB.
Figure 4B:
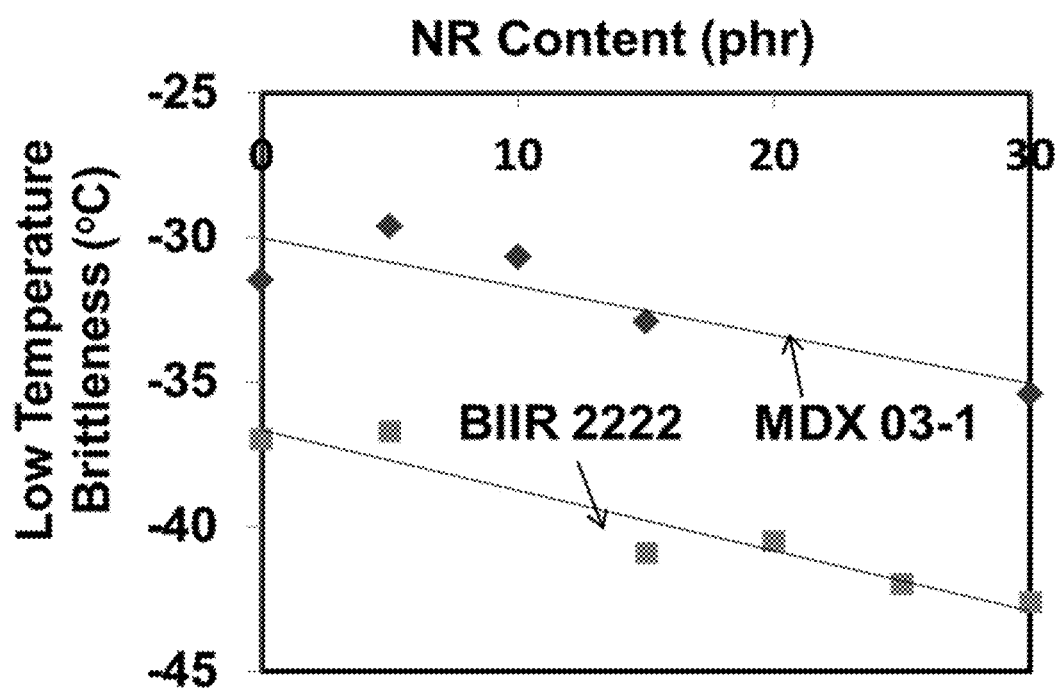

The effect of each of the components of the butyl based composition on the Tg of the butyl based composition can vary. As described herein, the components of the butyl based composition can include, but are not limited to, a primary polymer, a secondary polymer, an oil, the hydrocarbon resin, a tackifier, additives and the curing system. For example, the Tg of the primary polymer can largely impact the Tg of the butyl based composition. Further, the addition of secondary polymers such as natural rubber (or polybutadiene) can reduce the Tg of the butyl based composition and can improve cold cracking properties (which is particularly helpful in innerliner formulations). Reducing the Tg in the butyl based composition with natural rubber is shown in FIGS. 4A and 4B. For example, an 80/20 polymer/NR blend, a Tg=−3° C. can be achieved.

Likewise, Tg of the butyl based composition is effected by the oil, hydrocarbon resin and tackifier components. Generally, oil has a low Tg and can increase the free volume of the polymer chains. A low Tg reduces the Tg of the butyl based composition and improves fatigue, cold temperature properties, and ease of manufacture. However, a large amount of oil in the butyl based composition can increase permeability.

Hydrocarbon resins and tackifiers both have a high softening point and high Tg. Therefore, the resin and tackifier tend to increase the compound Tg. However, elimination of the resin results in poor compound mechanical properties and fatigue. Therefore, a combination of oil, resin, and tackifier with low Tg was used to produce a low Tg in the butyl based composition, while at the same time maintaining the butyl based composition properties and without effecting permeability.

As described in the examples below, to reduce the Tg of the butyl based composition, combinations of oils, resins or tackifiers and mixtures thereof were employed. Certain butyl based compositions showed a reduced Tg while maintaining composition properties including permeability.

In the examples provided herein, to determine the range of oil/resin/tackifier Tg (as provided by the examples below), small scale modeling using the Flory Fox equation for compound Tg was utilized. The Flory Fox Equation is:

$$\frac{1}{Tg_{compound\ FF}} = \sum_{n=1}^{\infty} \cdot \frac{w_i}{Tg_i}$$

-continued $$Tg_{compound\ corrected} = Tg_{compound\ FF} - CF$$

Figure 5A:
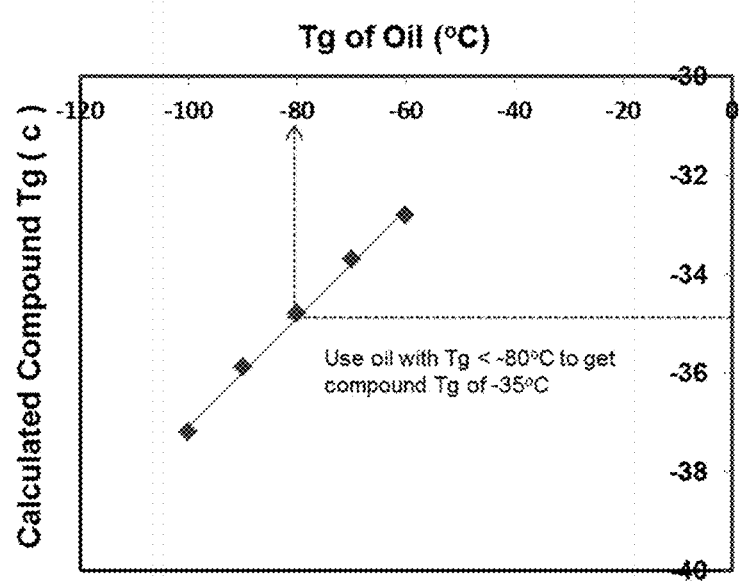
FIG. 5A depicts the effect of the Tg of oil on composition Tg.
Figure 5B:
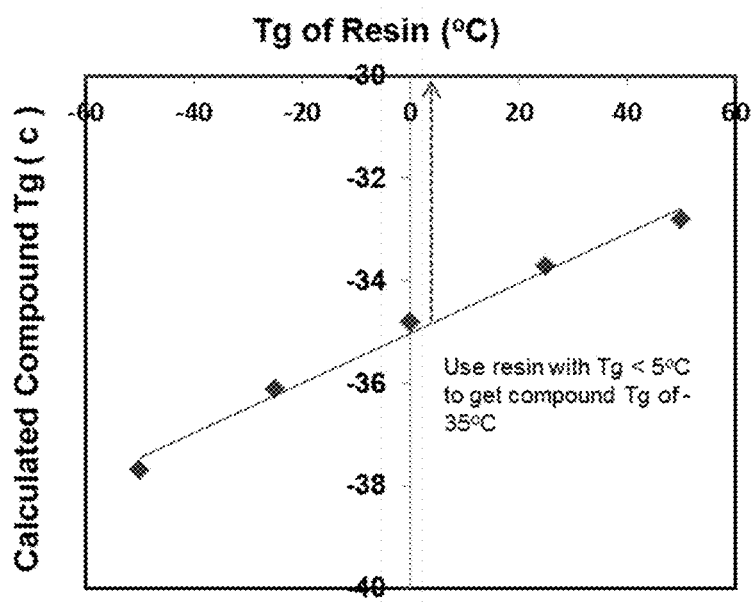
FIG. 5B depicts the effect of the Tg of resin on composition Tg.

Also, a correction factor ("CF"), the difference between calculated and experimental Tg, was applied. To estimate the desired Tg range of the components, the Tg of the butyl based composition was then calculated using different Tg values for oils and resins. Components were then selected to produce the desirable Tg ranges. For example, FIGS. 5A and 5B show Tg of the butyl based composition plotted with assumed Tg values of oils and resins. From these graphs, we inferred that a butyl based composition having a Tg value of −35° C. require either an oil Tg that is lower or equal to −85° C. (at the same resin type and amount), or a hydrocarbon resin Tg that is equal to or lower than 5° C.

Materials Used in the Examples Below

Commercially available polymers (EXXPRO™ 3433 and EXXPRO™ 3745) were obtained from ExxonMobil Chemical Company. EXXPRO™ inner liner program trial grades (EXXPRO™ 03-1, EXXPRO™ NPX 1603 and EXXPRO™ XP-50) were manufactured at ExxonMobil Chemical Company Baytown Chemical Plant ("BTCP"). Properties of the different EXXPRO™ grades can be found in Table 4. Natural rubber SMR-L and SMR CV 60 was used, whenever needed. Carbon black N660 (Continental Carbon) was used as the primary filler. ESCOREZ™ 1102 (ExxonMobil Chemical Company) was used as the tackifier. STRUKTOL™ 40 MS flakes (STRUKTOL™) was used as the homogenizing resin. Naphthalenic oil (CALSOL-810, Calumet Specialty Products) was used as the process oil. Magnesium Oxide (MAGLITE-K, Hallstar) was used as the scorch retarder. Zinc Oxide (KADOX™ 911, Horsehead Corporation) and Sulfur (Rubbermakers OT, Akrochem Corporation) were used as the vulcanizing agents. MBTS (AL-TAX™, Vanderbilt Chemicals) was used as the accelerator. Talc (AMTAL 6000D, Winfield Chemical Company) and Mistron HAR were used as high aspect ratio fillers wherever required.

Preparation of the Butyl Based Compositions

The compositions were prepared by conventional methods used in the tire and rubber industries. For example, typically, isobutylene based elastomers are prepared in two stages (although, in some cases, it could be done in one stage). In the first stage, also called the non-productive stage, the elastomers are mixed with the filler and processing aids (excluding the curative package). In the second stage, also called the productive stage (or final stage), the non-productive batch is mixed with the curative package. Typically, the final temperatures and total mixing times achieved in the non-productive stage is much greater than the productive stage. Typically, the final temperatures in the non-productive and productive mix ranges from 120° C. to 170° C. and 90° C. to 110° C. respectively. The mixing times depend on the mixer, the rotor configuration, rotor speed, the mixer cooling mechanism, the amount and type of filler used, the composition of the elastomer (heat conductivity of the elastomer), the oil addition time, and several other factors. The compositions described were prepared in a 1570 cc BANBURRY™ mixer (Black BR) or 5310 cc BANBURRY™ (Black OOC). Typically, the industry uses a non-productive ("NP") master batch fill factor of around ~75% to 80% and a rotor speed of 40 to 60 rpm. In our studies, we tried to keep the fill factor at around ~77% and a rotor speed of 70 rpm. Conventional masterbatch densities are ~1.12 g/cc. Hence, the actual NP masterbatch weights were around 1350 grams for almost all studies. The fill factor can also be calculated backwards. For example: 1350 gms/1.12 gms/L=1205 L; Fill factor=1205 L*100/1570 L=77%.

For the preparation of the NP masterbatch, polymer (one or more polymers) and composition components (i.e., tackifier, homogenizing resin, scorch retarder) were introduced into the mixer at time, t=0, and masticated for 1 minute; at time, t=1 minute, the carbon black followed by process oil was charged; this was followed by a ram sweep clean cycle at time, t=3 minutes; the NP master batch were dumped at temperatures—135° C. to 140° C. The total NP mixing time was approximately 5 to 7 minutes. This is the typical mix time for 2 wing mixers; for 4 wing mixers, the mix time could be as low as 3.5 minutes. In all cases, the material dumping was temperature controlled and not time controlled. For the final batch, the fill factors were kept at ~77% and the rotor speed was kept at 40 rpm. For the preparation of the final batch, the masterbatch was charged to the mixer at time, t=0; at time, t=45 seconds, the curing package (zinc oxide, sulfur, MBTS) was charged into the mixer. The final batch was dumped at 100° C. to 105° C. The total final batch mixing times were ~2-3 minutes. This is the typical mix time for 2 wing mixers; for 4 wing mixers, the mix time could be as low as 1.5 minutes. The final batch material dumping was also temperature controlled and not time controlled. The produced compositions were for several minutes on two roll mills to prepare thick pads. Whenever required, these pads were then re-mixed on large two roll mills to achieve the desired thickness for certain molds.

Example 1

Figure 1B:
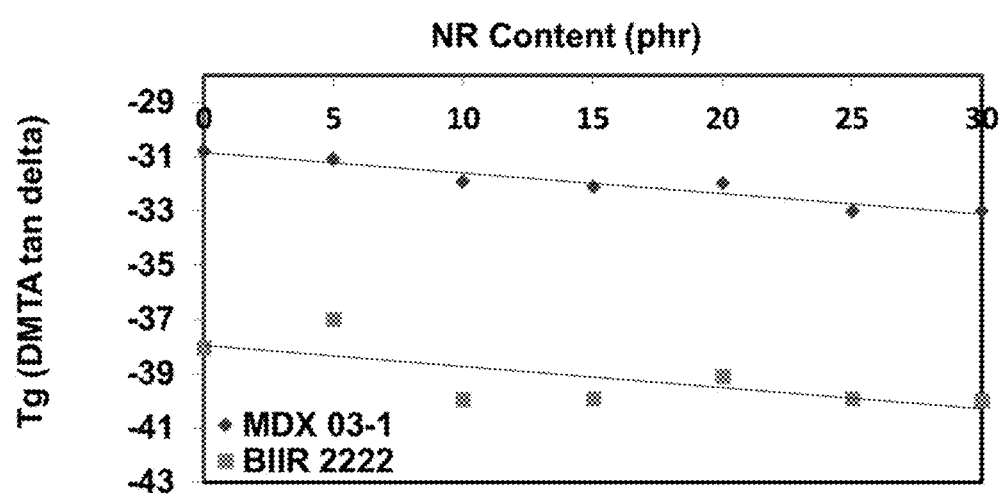
FIG. 1B shows the effect of varying natural rubber content on the Tg (and LTB) of 2 isobutylene-isoprene copolymer compositions.

Butyl based compositions were made with varying amounts of natural rubber (from 0 to 30 phr natural rubber) for both BIIR 2222 (isobutylene-isoprene based elastomer) and EXXPRO™ MDX 03-1 (isobutylene-co-para-methylstyrene based elastomer) using the model formulation provided in Table 2 above. In all cases the total elastomer content (primary+secondary) was kept constant at 100. FIGS. 1A and 1B show the effect of varying the amounts of natural rubber on the composition Tg (and LTB) and permeability properties of both BIIR 2222 and EXXPRO™ MDX 03-1 based compositions. The effect of varying the amounts of natural rubber on the composition properties of both BIIR 2222 and EXXPRO™ MDX 03-1 are shown below in Table 6A, 6B and 6C.

TABLE 6A

EFFECT OF VARYING NATURAL RUBBER CONTENT ON ISOBUTYLENE-ISOPRENE CO-POLYMER COMPOSITIONS, FIRST SET OF COMPOSITIONS

| Formulation | Units | 6A-1 | 6A-2 | 6A-3 | 6A-4 | 6A-5 |
|---|---|---|---|---|---|---|
| EXXPRO ™ 03-1 | phr | 100 | 95 | 90 | 85 | 80 |
| N660 | phr | 60 | 60 | 60 | 60 | 60 |
| Naphthenic Oil | phr | 8 | 8 | 8 | 8 | 8 |
| STRUKTOL ™ 40 MS | phr | 7 | 7 | 7 | 7 | 7 |
| ESCOREZ ™ 1102 | phr | 4 | 4 | 4 | 4 | 4 |
| Stearic Acid | phr | 1 | 1 | 1 | 1 | 1 |
| MgO | phr | 0.15 | 0.15 | 0.15 | 0.15 | 0.15 |
| Natural Rubber | phr | | 5 | 10 | 15 | 20 |
| NP Batch | phr | 180.15 | 180.15 | 180.15 | 180.15 | 180.15 |
| Zinc Oxide | phr | 1 | 1 | 1 | 1 | 1 |
| MBTS | phr | 1.25 | 1.25 | 1.25 | 1.25 | 1.25 |
| Sulfur | phr | 0.5 | 0.5 | 0.5 | 0.5 | 0.5 |
| Final Batch | phr | 182.9 | 182.9 | 182.9 | 182.9 | 182.9 |
| Compound Properties | | | | | | |
| ML (1 + 4) | [MU] | 56 | 56.6 | 58.1 | 55 | 54 |
| MDR times by 10's | | | | | | |
| Test Time | [Min] | 30 | 30 | 30 | 30 | 30 |
| Test Temp | [° C.] | 180 | 180 | 180 | 180 | 180 |
| Osc. angle | [Deg.] | 0.5 | 0.5 | 0.5 | 0.5 | 0.5 |
| MH – ML | [dNm] | 5.37 | 5.74 | 5.22 | 4.37 | 3.82 |
| ts2 | [Min] | 3.63 | 3.54 | 3.51 | 3.45 | 2.85 |
| Green Strength | | | | | | |
| PeakStress | [MPa] | 0.295 | 0.323 | 0.332 | 0.321 | 0.321 |
| StrnAtPeak | [%] | 66 | 65 | 59 | 63 | 65 |
| Hardness | | | | | | |
| Hardness | Zwick [Shore A] | 48 | 49 | 46 | 46 | 46 |
| Tensile Properties | | | | | | |
| 100Modulus | [MPa] | 1.349 | 1.417 | 1.335 | 1.202 | 1.085 |
| 300Modulus | [MPa] | 3.879 | 3.833 | 3.116 | 2.597 | 2.17 |
| StressAtBreak | [MPa] | 9.132 | 8.397 | 6.1 | 4.675 | 3.273 |
| % StrainAtBreak | [%] | 900 | 860 | 760 | 814 | 746 |
| Permeability | | | | | | |
| Permeability Coefficient | cc · mm/(m² · day · mmHg) | 0.2470 | 0.2734 | 0.3255 | 0.3799 | 0.4433 |

TABLE 6B

EFFECT OF VARYING NATURAL RUBBER CONTENT ON ISOBUTYLENE-ISOPRENE CO-POLYMER COMPOSITIONS, SECOND SET OF COMPOSITIONS

| Formulation | Units | 6B-1 | 6B-2 | 6B-3 | 6B-4 | 6B-5 |
|---|---|---|---|---|---|---|
| EXXPRO ™ 03-1 | phr | | | | 75 | 70 |
| N660 | phr | 60 | 60 | 60 | 60 | 60 |
| Naphthenic Oil | phr | 8 | 8 | 8 | 8 | 8 |
| STRUKTOL ™ 40 MS | phr | 7 | 7 | 7 | 7 | 7 |
| ESCOREZ ™ 1102 | phr | 4 | 4 | 4 | 4 | 4 |
| Stearic Acid | phr | 1 | 1 | 1 | 1 | 1 |
| MgO | phr | 0.15 | 0.15 | 0.15 | 0.15 | 0.15 |
| Natural Rubber | phr | | 5 | 10 | 25 | 30 |
| BROMOBUTYL 2222 | phr | 100 | 95 | 90 | | |
| NP Batch | phr | 180.15 | 180.15 | 180.15 | 180.15 | 180.15 |
| Zinc Oxide | phr | 1 | 1 | 1 | 1 | 1 |
| MBTS | phr | 1.25 | 1.25 | 1.25 | 1.25 | 1.25 |
| Sulfur | phr | 0.5 | 0.5 | 0.5 | 0.5 | 0.5 |
| Final Batch | phr | 182.9 | 182.9 | 182.9 | 182.9 | 182.9 |
| Compound Properties | | | | | | |
| ML (1 + 4) | [MU] | 54.7 | 54 | 54.5 | 52.8 | 49 |
| MDR times by 10's | | | | | | |
| Test Time | [Min] | 30 | 30 | 30 | 30 | 30 |
| Test Temp | [° C.] | 180 | 180 | 180 | 180 | 180 |
| Osc. angle | [Deg.] | 0.5 | 0.5 | 0.5 | 0.5 | 0.5 |
| MH − ML | [dNm] | 4.25 | 4.42 | 4.73 | 3.41 | 3.03 |
| ts2 | [Min] | 2.41 | 2.64 | 2.8 | 2.5 | 2.1 |
| Green Strength | | | | | | |
| PeakStress | [MPa] | 0.24 | 0.231 | 0.258 | 0.297 | 0.294 |
| StrnAtPeak | [%] | 63 | 65 | 57 | 67 | 68 |
| Hardness | | | | | | |
| Hardness | Zwick [Shore A] | 45 | 45 | 44 | 45 | 44 |
| Tensile Properties | | | | | | |
| 100Modulus | [MPa] | 1.047 | 1.071 | 1.102 | 1.031 | 1.071 |
| 300Modulus | [MPa] | 3.085 | 3.157 | 3.375 | 2.154 | 2.207 |
| StressAtBreak | [MPa] | 9.473 | 9.784 | 10.032 | 3.335 | 3.415 |
| % StrainAtBreak | [%] | 827 | 818 | 815 | 740 | 718 |
| Permeability | | | | | | |
| Permeability Coefficient | cc · mm/(m² · day · mmHg) | 0.2882 | 0.3273 | 0.3718 | 0.4841 | 0.5516 |

TABLE 6C

EFFECT OF VARYING NATURAL RUBBER CONTENT ON ISOBUTYLENE-ISOPRENE CO-POLYMER COMPOSITIONS, THIRD SET OF COMPOSITIONS

| Formulation | Units | 6C-1 | 6C-2 | 6C-3 | 6C-4 |
|---|---|---|---|---|---|
| N660 | phr | 60 | 60 | 60 | 60 |
| Naphthenic Oil | phr | 8 | 8 | 8 | 8 |
| STRUKTOL ™ 40 MS | phr | 7 | 7 | 7 | 7 |
| ESCOREZ ™ 1102 | phr | 4 | 4 | 4 | 4 |
| Stearic Acid | phr | 1 | 1 | 1 | 1 |
| MgO | phr | 0.15 | 0.15 | 0.15 | 0.15 |
| Natural Rubber | phr | 15 | 20 | 25 | 30 |
| BROMOBUTYL 2222 | phr | 85 | 80 | 75 | 70 |
| NP Batch | phr | 180.15 | 180.15 | 180.15 | 180.15 |
| Zinc Oxide | phr | 1 | 1 | 1 | 1 |
| MBTS | phr | 1.25 | 1.25 | 1.25 | 1.25 |
| Sulfur | phr | 0.5 | 0.5 | 0.5 | 0.5 |
| Final Batch | phr | 182.9 | 182.9 | 182.9 | 182.9 |
| Compound Properties | | | | | |
| ML (1 + 4) | [MU] | 54.1 | 51.7 | 52.4 | 49.5 |

TABLE 6C-continued

EFFECT OF VARYING NATURAL RUBBER CONTENT ON ISOBUTYLENE-
ISOPRENE CO-POLYMER COMPOSITIONS, THIRD SET OF COMPOSITIONS

| Formulation | Units | 6C-1 | 6C-2 | 6C-3 | 6C-4 |
|---|---|---|---|---|---|
| MDR times by 10's | | | | | |
| Test Time | [Min] | 30 | 30 | 30 | 30 |
| Test Temp | [° C.] | 180 | 180 | 180 | 180 |
| Osc. angle | [Deg.] | 0.5 | 0.5 | 0.5 | 0.5 |
| MH – ML | [dNm] | 4.72 | 4.56 | 4.57 | 4.02 |
| ts2 | [Min] | 2.78 | 2.77 | 2.36 | 2.36 |
| Green Strength | | | | | |
| PeakStress | [MPa] | 0.256 | 0.241 | 0.279 | 0.259 |
| StrnAtPeak | [%] | 66 | 73 | 66 | 71 |
| Hardness | | | | | |
| Hardness | Zwick [Shore A] | 44 | 43 | 44 | 43 |
| Tensile Properties | | | | | |
| 100Modulus | [MPa] | 1.117 | 1.069 | 1.091 | 0.981 |
| 300Modulus | [MPa] | 3.429 | 3.37 | 3.451 | 3.199 |
| StressAtBreak | [MPa] | 10.143 | 10.261 | 10.532 | 10.209 |
| % StrainAtBreak | [%] | 787 | 791 | 791 | 780 |
| Permeability | | | | | |
| Permeability Coefficient | cc · mm/(m² · day · mmHg) | 0.4228 | 0.4888 | 0.5117 | 0.5811 |

The addition of natural rubber decreases the composition Tg; however, natural rubber increases the composition permeability, which is undesirable for applications such as tire inner liners. For example, a 20 phr addition of NR decreases the Tg by around 3° C., but almost doubles the permeability coefficient, when compared with 100% BIIR 2222 or EXXPRO™MDX 03-1 composition.

Example 2

Butyl based compositions were made with varying amounts of process oils, namely naphthalenic oil (from 0-12 phr oil) for both BIIR 2222 (isobutylene-isoprene based elastomer) and EXXPRO™MDX 03-1 (isobutylene-co-para-methyl-styrene based elastomer) using the butyl based composition provided in Table 2 above. FIGS. 2A and 2B show the effect of varying the amounts of oil on the composition Tg (and LTB) and permeability properties of both BIIR 2222 and EXXPRO™ MDX 03-1 based compositions. The effect of varying the amounts of oil on the composition properties of both BIIR 2222 and EXXPRO™ MDX 03-1 are shown in Table 5. The addition of oil decreases the compositions Tg. However, oil increases the composition permeability, which is undesirable for applications such as tire innerliners. For example, an increase in oil content from 2 to 12 phr, decreases the Tg by around 4° C., but almost doubles the permeability coefficient for both the BIIR 2222 and EXXPRO™ MDX 03-1 compositions.

Example 3

Butyl based compositions were made with several commercially available plasticizers using BIIR 2222 (isobutylene-isoprene based elastomer). The formulation described above in Table 2 above was modified. Here, plasticizers were added (by 10 phr) in addition to the ingredients specified in Table 2.

Table 7 below shows effect of several plasticizers on ΔTg depression and permeability increase when introduced at 5 wt. % (10 phr) to the composition.

TABLE 7

EFFECT OF PLASTICIZERS ON THE TG AND PERMEABILITY
OF ISOBUTYLENE-ISOPRENE COMPOSITIONS

| Grade | Chemical Composition | Tg depression (Delta Tg ° C.) | Permeability Increase (%) |
|---|---|---|---|
| OBJECTIVE | | −5 | 0 |
| Bis 2 ethyl hexyl sebacate | Bis 2 ethyl hexyl sebacate | −6.92 | 77% |
| Santicizer 711 | Diundecyl benzene 1,2 dicarboxylate | −5.8 | 55% |
| LINPLAST TM 812 | C 12 Alkyl Phthalate | −4.9 | 57% |
| JAYFLEX TM DIDP | Di-isodecyl Phthalate | −4.86 | 48% |
| Dioctyl Terepthalate | Dioctyl Terepthalate | −4.13 | 51% |
| BENZOFLEX ™ 2088 | Dibenzoate | −3.94 | 14% |

The addition of the plasticizer decreased the composition Tg; however, composition permeability was increased, which is undesirable for applications such as tire inner liners. All selected plasticizers lowered the composition Tg by −5° C.; however, permeability was increased by 15-80%. Since the Tg difference between BIIR 2222 and EXXPRO™ MDX 03-1 is constant for a given formulation, the same result can be expected when the plasticizers will be used with EXXPRO™ MDX 03-1 based formulations.

Example 4

Butyl based compositions were made with varying amounts of homogenizing hydrocarbon resin, namely, STRUKTOL™ 40 MS (from 0 phr to 10 phr resin) for both BIIR 2222 (isobutylene-isoprene based elastomer) and EXXPRO™ MDX 03-1 (isobutylene-co-para-methyl-styrene based elastomer) using the formulation of the butyl based composition provided in Table 2. The effect of varying the amounts of oil on the composition properties of both BIIR 2222 and EXXPRO™ MDX 03-1 are shown below in Table 8.

TABLE 8

EFFECT OF THE RESIN ON THE PROPERTIES
OF ISOBUTYLENE-ISOPRENE COMPOSITIONS

| Formulation | Units | 8-1 | 8-2 | 8-3 | 8-4 | 8-5 |
|---|---|---|---|---|---|---|
| EXXPRO ™ 03-1 | Phr | 100 | 100 | 100 | 100 | 100 |
| N660 | Phr | 60 | 60 | 60 | 60 | 60 |
| Stearic Acid | Phr | 1 | 1 | 1 | 1 | 1 |
| Naphthenic Oil | Phr | 8 | 8 | 8 | 8 | 8 |
| ESCOREZ ™ 1102 | Phr | 4 | 4 | 4 | 4 | 4 |
| MgO | Phr | 0.15 | 0.15 | 0.15 | 0.15 | 0.15 |
| STRUKTOL ™ 40 MS | Phr | 0 | 2 | 4 | 7 | 10 |
| NP batch | Phr | 173.15 | 175.15 | 177.15 | 180.15 | 183.15 |
| Zinc Oxide | Phr | 1 | 1 | 1 | 1 | 1 |
| MBTS | Phr | 1.25 | 1.25 | 1.25 | 1.25 | 1.25 |
| Sulfur | Phr | 0.5 | 0.5 | 0.5 | 0.5 | 0.5 |
| Final Batch | Phr | 175.9 | 177.9 | 179.9 | 182.9 | 185.9 |
| Compound Properties | | | | | | |
| ML (1 + 4) | MU | 57.2 | 64.7 | 63.6 | 62.4 | 59.1 |
| MDR times by 10's | | | | | | |
| Test Time | [Min] | 30 | 30 | 30 | 30 | 30 |
| Test Temp | [° C.] | 180 | 180 | 180 | 180 | 180 |
| Osc. angle | [Deg.] | 0.5 | 0.5 | 0.5 | 0.5 | 0.5 |
| MH – ML | [dNm] | 5.58 | 5.73 | 5.79 | 5.77 | 5.51 |
| ts2 | [Min] | 3.69 | 4.06 | 3.89 | 3.89 | 3.87 |
| t90 | [Min] | 9.94 | 12.62 | 11.61 | 12.1 | 11.86 |
| Green Strength | | | | | | |
| PeakStress | [MPa] | 0.399 | 0.384 | 0.368 | 0.363 | 0.276 |
| TimeTo75 | [min] | 0.807 | 2.383 | 2.963 | 2.627 | 2.238 |
| Hardness | | | | | | |
| Hardness | Zwick '[Shore A] | 58.2 | 53.8 | 55.6 | 55.6 | 56.8 |
| Tensile Properties | | | | | | |
| 100Modulus | [MPa] | 2.061 | 1.76 | 1.783 | 1.613 | 1.589 |
| 300Modulus | [MPa] | 8.103 | 6.356 | 6.185 | 4.642 | 4.376 |
| StressAtBreak | [MPa] | 10.653 | 10.551 | 10.404 | 9.204 | 8.846 |
| % StrainAtBreak | [%] | 430 | 527 | 652 | 740 | 800 |
| Permeability | | | | | | |
| Permeability Coefficient | (mm) · (cc)/m² · day · mmHg | 0.227 | 0.227 | 0.227 | 0.254 | 0.22 |

The addition of oil decreases the butyl based composition Tg; however, oil increased composition permeability, which is undesirable for applications such as tire inner liners. For example, an increase in oil content from 2 to 12 phr decreases the Tg by around 4° C., but almost doubles the permeability coefficient for both the BIIR 2222 and EXXPRO™ MDX 03-1 butyl based compositions.

Example 5

Butyl based compositions were made with a different low Tg liquid resins (replacing the homogenizing resin) and EXXPRO™ MDX 03-1 (isobutylene-co-para-methyl-styrene based elastomer) using the butyl based composition provided in Table 2. Table 9 below shows the effect on ΔTg depression and permeability increase when the hydrocarbon resin was substituted for the homogenizing resin.

TABLE 9

EFFECT OF EXAMPLE EMCC LOW TG HYDROCARBON
RESIN ON THE TG AND PERMEABILITY OF
ISOBUTYLENE-ISOPRENE COMPOSITIONS

| Component | Content (phr) | Tg depression (° C.) | Permeability Increase (%) |
|---|---|---|---|
| OBJECTIVE | | −5 | 0 |
| ESCOREZ ™ 2520 (Tg = −25) | Substitute STRUKTOL TM 40 MS (7 phr) | −2.2 | 16.0% |
| ESCOREZ ™ 5000 fill (Tg = −15) | Substitute STRUKTOL TM 40 MS (7 phr) | −3.2 | 25.2% |
| WINGTACK ™ 10 | Substitute STRUKTOL TM 40 MS (7 phr) | −5 | 16.9% |

TABLE 9-continued

EFFECT OF EXAMPLE EMCC LOW TG HYDROCARBON RESIN ON THE TG AND PERMEABILITY OF ISOBUTYLENE-ISOPRENE COMPOSITIONS

| Component | Content (phr) | Tg depression (° C.) | Permeability Increase (%) |
|---|---|---|---|
| Experimental Claimed Cyclic Resin (Tg = −53) | Substitute STRUKTOL TM 40 MS (7 phr) | −4.2 | 3.2% |
| Experimental Claimed $C_9$ Resin (Tg = −21) | Substitute STRUKTOL TM 40 MS (7 phr) | −3 | 1.8% |

The addition of the hydrocarbon resins decreases the composition Tg; however, hydrocarbon resin did not increase the composition permeability, which is desirable for applications such as tire inner liners. The selected hydrocarbon resins lowered the butyl based composition Tg by −3° C. to −5° C. and permeability was maintained. Since the Tg difference between BIIR 2222 and EXXPRO™ MDX 03-1 is constant for a given formulation, the same result is expected when the plasticizers will be used with BIIR 2222 based compositions. The effect of hydrocarbon resins on the composition properties of EXXPRO™ MDX 03-1 are shown in Table 10A1 through Table 10B11.

TABLE 10A1

EFFECT OF THE EXAMPLE EMCC LOW TG LIQUID RESIN SYSTEMS ON THE EXXPRO™ MDX 03-1 COMPOSITION PROPERTIES, FIRST SET OF COMPOSITION COMPONENTS

|  | 10A1-1 | 10A1-2 | 10A1-3 | 10A1-4 |
|---|---|---|---|---|
| Description | ESCOREZ™ 2520 | E5000 Fill | Cyclix Resin CSTR # 3 | C9 Resin CSTR # 4 |
| Density [kg/l] | 1.141 | 1.141 | 1.141 | 1.141 |
| EXXPRO TM 03-1 | 100 | 100 | 100 | 100 |
| N660 | 60 | 60 | 60 | 60 |
| CALSOL 810 | 8 | 8 | 8 | 8 |
| STRUKTOL™ 40 MS | 7 | 7 | 7 | 7 |
| STEARIC ACI 5016NF | 1 | 1 | 1 | 1 |
| Multipass level | 176 | 176 | 176 | 176 |
| KADOX™ 911 | 1 | 1 | 1 | 1 |
| ALTAX TM MBTS | 1.25 | 1.25 | 1.25 | 1.25 |
| SULFUR | 0.5 | 0.5 | 0.5 | 0.5 |
| RUBBERMAKER Total phr lab | 178.75 | 178.75 | 178.75 | 178.75 |

TABLE 10B1

EFFECT OF THE EXAMPLE EMCC LOW TG LIQUID RESIN SYSTEMS ON THE EXXPRO™ MDX 03-1 COMPOSITION PROPERTIES, SECOND SET OF COMPOSITION COMPONENTS

|  | 10B1-1 | 10B1-2 | 10B1-3 |
|---|---|---|---|
| Description | Styrene | Styrene Low Monomer | WINGTACK™ 10 |
| Density [kg/l] | 1.141 | 1.141 | 1.141 |
| EXXPRO™ 03-1 | 100 | 100 | 100 |
| N660 | 60 | 60 | 60 |
| CALSOL 810 | 8 | 8 | 8 |
| STRUKTOL™ 40 MS | 7 | 7 | 7 |
| STEARIC ACID 5016NF | 1 | 1 | 1 |
| Multipass level | 176 | 176 | 176 |
| KADOX™ 911 | 1 | 1 | 1 |
| ALTAX™ MBTS | 1.25 | 1.25 | 1.25 |
| SULFUR | 0.5 | 0.5 | 0.5 |
| RUBBERMAKER Total phr lab | 178.75 | 178.75 | 178.75 |

TABLE 10A2

EFFECT OF THE EXAMPLE EMCC LOW TG LIQUID RESIN SYSTEMS ON THE EXXPRO™ MDX 03-1 COMPOSITION PROPERTIES, MOONEY ML(1 + 8) + STRESS RELAX, FIRST SET

| Mooney ML(1 + 8) + Stress Relax |  | 10A2-1 | 10A2-2 | 10A2-3 | 10A2-4 |
|---|---|---|---|---|---|
| Test temp | [° C.] | 100 | 100 | 100 | 100 |
| Test time | [min.] | 8 | 8 | 8 | 8 |
| Preheat | [min.] | 1 | 1 | 1 | 1 |
| Decay | [min.] | 2 | 2 | 2 | 2 |
| Mm | [MU] | 49.66 | 51.24 | 52.62 | 52.5 |
| tMm | [min.] | 4.65 | 5.13 | 5.33 | 6.02 |
| Visc@4 | [MU] | 49.8 | 51.8 | 52.9 | 52.9 |
| Visc@8 | [MU] | 50.4 | 51.8 | 53 | 53 |
| Visc@8.01 | [MU] | 50.38 | 51.81 | 53.04 | 52.95 |
| Visc@8.02 | [MU] | 50.38 | 51.81 | 53.04 | 52.95 |

TABLE 10B2

EFFECT OF THE EXAMPLE EMCC LOW TG LIQUID RESIN SYSTEMS ON THE EXXPRO™ MDX 03-1 COMPOSITION PROPERTIES, MOONEY ML(1 + 8) + STRESS RELAX, SECOND SET

| Mooney ML(1 + 8) + Stress Relax |  | 10B2-1 | 10B2-2 | 10B2-3 |
|---|---|---|---|---|
| Test temp | [° C.] | 100 | 100 | 100 |
| Test time | [min.] | 8 | 8 | 8 |
| Preheat | [min.] | 1 | 1 | 1 |
| Decay | [min.] | 2 | 2 | 2 |
| Mm | [MU] | 51.6 | 50.43 | 54.85 |
| tMm | [min.] | 4.67 | 7.07 | 5.75 |
| Visc@4 | [MU] | 52.4 | 51 | 55.3 |
| Visc@8 | [MU] | 52.4 | 50.7 | 55.2 |
| Visc@8.01 | [MU] | 52.36 | 50.69 | 55.16 |
| Visc@8.02 | [MU] | 52.36 | 50.69 | 55.16 |

TABLE 10A3

EFFECT OF THE EXAMPLE EMCC LOW TG LIQUID RESIN SYSTEMS ON THE EXXPRO™ MDX 03-1 COMPOSITION PROPERTIES, MOONEY SCORCH ON MV2000E, TEST TEMPERATURE 125° C., FIRST SET

| Mooney Scorch on MV2000E |  | 10A3-1 | 10A3-2 | 10A3-3 | 10A3-4 |
|---|---|---|---|---|---|
| Test temp | [° C.] | 125 | 125 | 125 | 125 |
| Test time | [min] | 60 | 60 | 60 | 60 |
| Preheat | [min] | 1 | 1 | 1 | 1 |
| Mm | [MU] | 20.3 | 20.8 | 20.93 | 21.11 |

TABLE 10A3-continued

EFFECT OF THE EXAMPLE EMCC LOW TG LIQUID RESIN SYSTEMS ON THE EXXPRO ™ MDX 03-1 COMPOSITION PROPERTIES, MOONEY SCORCH ON MV2000E, TEST TEMPERATURE 125° C., FIRST SET

| Mooney Scorch on MV2000E | | 10A3-1 | 10A3-2 | 10A3-3 | 10A3-4 |
|---|---|---|---|---|---|
| tMm | [min.] | 4.48 | 4.52 | 3.82 | 3.8 |
| t3 | [min.] | 47.75 | 43.18 | 41.14 | 43.97 |
| t10 | [min.] |  | 58.4 | 58.67 |  |
| Curerate 1 |  | 0.07 | 0.06 | 0.06 | 0.05 |

TABLE 10B3

EFFECT OF THE EXAMPLE EMCC LOW TG LIQUID RESIN SYSTEMS ON THE EXXPRO ™ MDX 03-1 COMPOSITION PROPERTIES, MOONEY SCORCH ON MV2000E, TEST TEMPERATURE 125° C., SECOND SET

| Mooney Scorch on MV2000E | | 10B3-1 | 10B3-2 | 10B3-3 |
|---|---|---|---|---|
| Test temp | [° C.] | 125 | 125 | 125 |
| Test time | [min] | 60 | 60 | 60 |
| Preheat | [min] | 1 | 1 | 1 |
| Mm | [MU] | 21.14 | 20.61 | 23.23 |
| tMm | [min.] | 4.73 | 5.77 | 5.07 |
| t2 | [min.] | 40.47 | 37.42 | 41.74 |
| t3 | [min.] | 48.46 | 44.87 | 47.7 |
| t10 | [min.] |  | 58.64 | 58.66 |
| Curerate 1 |  | 0.06 | 0.07 | 0.08 |

TABLE 10A4

EFFECT OF THE EXAMPLE EMCC LOW TG LIQUID RESIN SYSTEMS ON THE EXXPRO ™ MDX 03-1 COMPOSITION PROPERTIES, MOONEY SCORCH ON MV2000E, TEST TEMPERATURE 135° C., FIRST SET

| Mooney Scorch on MV2000E | | 10A4-1 | 10A4-2 | 10A4-3 | 10A4-4 |
|---|---|---|---|---|---|
| Test temp | [° C.] | 135 | 135 | 135 | 135 |
| Test time | [min] | 60 | 60 | 60 | 60 |
| Preheat | [min] | 1 | 1 | 1 | 1 |
| Mm | [MU] | 17.94 | 19.03 | 19.23 | 19.06 |
| tMm | [min.] | 5.08 | 4.02 | 3.9 | 3.57 |
| t3 | [min.] | 26.17 | 24.65 | 24.49 | 25.2 |
| t10 | [min.] | 32.51 | 31.1 | 30.57 | 32.13 |
| t35 | [min.] | 34.46 | 33.02 | 32.87 | 34.09 |
| Curerate 1 |  | 0.17 | 0.18 | 0.17 | 0.16 |

TABLE 10B4

EFFECT OF THE EXAMPLE EMCC LOW TG LIQUID RESIN SYSTEMS ON THE EXXPRO ™ MDX 03-1 COMPOSITION PROPERTIES, MOONEY SCORCH ON MV2000E, TEST TEMPERATURE 135° C., SECOND SET

| Mooney Scorch on MV2000E | | 10B4-1 | 10B4-2 | 10B4-3 |
|---|---|---|---|---|
| Test temp | [° C.] | 135 | 135 | 135 |
| Test time | [min] | 60 | 60 | 60 |
| Preheat | [min] | 1 | 1 | 1 |
| Mm | [MU] | 19.13 | 18.71 | 21.03 |
| tMm | [min.] | 4.93 | 4 | 5.23 |
| t2 | [min.] | 24.95 | 21.72 | 22.88 |
| t35 | [min.] | 35.82 | 32.27 | 32.5 |
| Curerate 1 |  | 0.2 | 0.2 | 0.22 |

TABLE 10A5

EFFECT OF THE EXAMPLE EMCC LOW TG LIQUID RESIN SYSTEMS ON THE EXXPRO ™ MDX 03-1 COMPOSITION PROPERTIES, MDR TIMES BY 10'S, TEST TEMPERATURE 160° C., FIRST SET

| MDR times by 10's | | 10A5-1 | 10A5-2 | 10A5-3 | 10A5-4 |
|---|---|---|---|---|---|
| Test Time | [Min] | 30 | 30 | 30 | 30 |
| Test Temp | [° C.] | 160 | 160 | 160 | 160 |
| Osc. angle | [Deg.] | 0.5 | 0.5 | 0.5 | 0.5 |
| ML | [dNm] | 1.32 | 1.36 | 1.33 | 1.38 |
| MH | [dNm] | 6.26 | 6.72 | 5.94 | 6.5 |
| MH – ML | [dNm] | 4.94 | 5.36 | 4.61 | 5.12 |
| ts2 | [Min] | 7.39 | 7.03 | 6.32 | 7.31 |
| t90 | [Min] | 15.27 | 15.52 | 13.56 | 15.11 |
| Peak Rate | [dNm/min] | 0.64 | 0.66 | 0.61 | 0.65 |
| Peak Time | [Min] | 7.15 | 7.54 | 6 | 7.63 |
| tMH | [Min] | 29.94 | 29.99 | 29.99 | 29.9 |

TABLE 10B5

EFFECT OF THE EXAMPLE EMCC LOW TG LIQUID RESIN SYSTEMS ON THE EXXPRO ™ MDX 03-1 COMPOSITION PROPERTIES, MDR TIMES BY 10'S, TEST TEMPERATURE 160° C., SECOND SET

| MDR times by 10's | | 10B5-1 | 10B5-2 | 10B5-3 |
|---|---|---|---|---|
| Test Time | [Min] | 30 | 30 | 30 |
| Test Temp | [° C.] | 160 | 160 | 160 |
| Osc. angle | [Deg.] | 0.5 | 0.5 | 0.5 |
| ML | [dNm] | 1.39 | 1.33 | 1.55 |
| MH | [dNm] | 6.43 | 6.6 | 6.79 |
| MH – ML | [dNm] | 5.04 | 5.27 | 5.24 |
| ts2 | [Min] | 7.77 | 6.92 | 6.34 |
| t90 | [Min] | 15.12 | 14.02 | 14.84 |
| Peak Rate | [dNm/min] | 0.65 | 0.72 | 0.71 |
| Peak Time | [Min] | 8.35 | 7.27 | 6.49 |
| tMH | [Min] | 29.99 | 29.97 | 29.96 |

TABLE 10A6

EFFECT OF THE EXAMPLE EMCC LOW TG LIQUID RESIN SYSTEMS ON THE EXXPRO ™ MDX 03-1 COMPOSITION PROPERTIES, MDR TIMES BY 10'S, TEST TEMPERATURE 180° C., FIRST SET

| MDR times by 10's | | 10A6-1 | 10A6-2 | 10A6-3 | 10A6-3 |
|---|---|---|---|---|---|
| Test Time | [Min] | 30 | 30 | 30 | 30 |
| Test Temp | [° C.] | 180 | 180 | 180 | 180 |
| Osc. angle | [Deg.] | 0.5 | 0.5 | 0.5 | 0.5 |
| ML | [dNm] | 1.1 | 1.14 | 1.11 | 1.15 |
| MH | [dNm] | 6.55 | 7.42 | 6.07 | 6.75 |
| MH – ML | [dNm] | 5.45 | 6.28 | 4.96 | 5.6 |
| ts2 | [Min] | 2.55 | 2.48 | 2.07 | 2.53 |
| t90 | [Min] | 16.13 | 17.76 | 7.04 | 14.94 |
| Peak Rate | [dNm/min] | 1.91 | 2.03 | 2.05 | 2 |
| Peak Time | [Min] | 2.63 | 2.57 | 1.85 | 2.56 |
| tMH | [Min] | 29.99 | 29.99 | 30 | 29.97 |

TABLE 10B6

EFFECT OF THE EXAMPLE EMCC LOW TG LIQUID RESIN SYSTEMS ON THE EXXPRO ™ MDX 03-1 COMPOSITION PROPERTIES, MDR TIMES BY 10'S, TEST TEMPERATURE 180° C., SECOND SET

| MDR times by 10's | | 10B6-1 | 10B6-2 | 10B6-3 |
|---|---|---|---|---|
| Test Time | [Min] | 30 | 30 | 30 |
| Test Temp | [° C.] | 180 | 180 | 180 |
| Osc. angle | [Deg.] | 0.5 | 0.5 | 0.5 |

TABLE 10B6-continued

EFFECT OF THE EXAMPLE EMCC LOW TG LIQUID RESIN SYSTEMS ON THE EXXPRO ™ MDX 03-1 COMPOSITION PROPERTIES, MDR TIMES BY 10'S, TEST TEMPERATURE 180° C., SECOND SET

| MDR times by 10's | | 10B6-1 | 10B6-2 | 10B6-3 |
|---|---|---|---|---|
| ML | [dNm] | 1.16 | 1.08 | 1.31 |
| MH | [dNm] | 6.71 | 6.92 | 7.25 |
| MH − ML | [dNm] | 5.55 | 5.84 | 5.94 |
| ts2 | [Min] | 2.74 | 2.47 | 2.12 |
| t90 | [Min] | 16.36 | 17.37 | 16.43 |
| Peak Rate | [dNm/min] | 1.93 | 2.09 | 2.36 |
| Peak Time | [Min] | 2.74 | 2.58 | 2.08 |
| tMH | [Min] | 29.98 | 29.96 | 29.99 |

TABLE 10A7

EFFECT OF THE EXAMPLE EMCC LOW TG LIQUID RESIN SYSTEMS ON THE EXXPRO ™ MDX 03-1 COMPOSITION PROPERTIES, GREEN STRENGTH (TIRE METHOD), FIRST SET

| Green Strength (Tire Method) | | 10A7-1 | 10A7-2 | 10A7-3 | 10A7-4 |
|---|---|---|---|---|---|
| 100Modulus | [MPa] | 0.341 | 0.377 | 0.402 | 0.467 |
| Peak Load | [N] | 10.079 | 9.879 | 9.64 | 11.104 |
| Peak Stress | [MPa] | 0.345 | 0.384 | 0.409 | 0.49 |
| Strn At Peak | [%] | 79.983 | 76.241 | 74.991 | 58.742 |
| Ld@100Str | [N] | 9.969 | 9.688 | 9.446 | 10.699 |
| Strs@ StrnEnd | [MPa] | 0.341 | 0.377 | 0.402 | 0.467 |

TABLE 10B7

EFFECT OF THE EXAMPLE EMCC LOW TG LIQUID RESIN SYSTEMS ON THE EXXPRO ™ MDX 03-1 COMPOSITION PROPERTIES, GREEN STRENGTH (TIRE METHOD), SECOND SET

| Green Strength (Tire Method) | | 10B7-1 | 10B7-2 | 10B7-3 |
|---|---|---|---|---|
| 100Modulus | [MPa] | 0.357 | 0.372 | 0.441 |
| Peak Load | [N] | 8.548 | 8.79 | 9.564 |
| Peak Stress | [MPa] | 0.364 | 0.381 | 0.454 |
| Strn At Peak | [%] | 69.151 | 71.242 | 70.824 |
| Ld@100Str | [N] | 8.379 | 8.609 | 9.3 |
| Strs@ StrnEnd | [MPa] | 0.357 | 0.372 | 0.441 |

TABLE 10A8

EFFECT OF THE EXAMPLE EMCC LOW TG LIQUID RESIN SYSTEMS ON THE EXXPRO TM MDX 03-1 COMPOSITION PROPERTIES, HARDNESS SHORE A (ZWICK), FIRST SET

| Hardness Shore A (Zwick) | | 10A8-1 | 10A8-2 | 10A8-3 | 10A8-4 |
|---|---|---|---|---|---|
| Test Delay (3 sec.) | [sec.] | 3 | 3 | 3 | 3 |
| Test Temp. | [° C.] | 23 | 23 | 23 | 23 |
| Hardness A | [Shore A] | 44 | 46 | 44 | 46 |

TABLE 10B8

EFFECT OF THE EXAMPLE EMCC LOW TG LIQUID RESIN SYSTEMS ON THE EXXPRO TM MDX 03-1 COMPOSITION PROPERTIES, HARDNESS SHORE A (ZWICK), SECOND SET

| Hardness Shore A (Zwick) | | 10B8-1 | 10B8-2 | 10B8-3 |
|---|---|---|---|---|
| Test Delay (3 sec.) | [sec.] | 3 | | |
| Test Temp. | [° C.] | 23 | | |
| Hardness A | [Shore A] | 46 | 45 | 46 |

TABLE 10A9

EFFECT OF THE EXAMPLE EMCC LOW TG LIQUID RESIN SYSTEMS ON THE EXXPRO ™ MDX 03-1 COMPOSITION PROPERTIES, HARDNESS SHORE A (ZWICK), AGED 3 DAYS, FIRST SET

| Hardness Shore A (Zwick) | | 10A9-1 | 10A9-2 | 10A9-3 | 10A9-4 |
|---|---|---|---|---|---|
| Test Delay (3 sec.) | [sec.] | 3 | 3 | 3 | 3 |
| Aged 3-Days @ 125° C. | | | | | |
| Test Temp. | [° C.] | 23 | 23 | 23 | 23 |

TABLE 10B9

EFFECT OF THE EXAMPLE EMCC LOW TG LIQUID RESIN SYSTEMS ON THE EXXPRO ™ MDX 03-1 COMPOSITION PROPERTIES, HARDNESS SHORE A (ZWICK), AGED 3 DAYS, SECOND SET

| Test Delay (3 sec.) | [sec.] | 3 |
|---|---|---|
| Aged 3-Days @125° C. | | |
| Test Temp. | [° C.] | 23 |

TABLE 10A10

EFFECT OF THE EXAMPLE EMCC LOW TG LIQUID RESIN SYSTEMS ON THE EXXPRO ™ MDX 03-1 COMPOSITION PROPERTIES, TENSILE 1000 TEST, FIRST SET

| Tensile 1000 Test | | 10A10-1 | 10A10-2 | 10A10-3 | 10A10-4 |
|---|---|---|---|---|---|
| 10Modulus | [MPa] | 0.408 | 0.402 | 0.422 | 0.379 |
| 20Modulus | [MPa] | 0.59 | 0.592 | 0.604 | 0.574 |
| 30Modulus | [MPa] | 0.715 | 0.733 | 0.734 | 0.717 |
| 40Modulus | [MPa] | 0.819 | 0.845 | 0.84 | 0.832 |
| 50Modulus | [MPa] | 0.913 | 0.949 | 0.932 | 0.94 |
| 60Modulus | [MPa] | 1.005 | 1.052 | 1.022 | 1.047 |
| 100Modulus | [MPa] | 1.441 | 1.535 | 1.452 | 1.575 |
| 200Modulus | [MPa] | 3.122 | 3.499 | 3.07 | 3.475 |
| 300Modulus | [MPa] | 5.305 | 5.956 | 5.25 | 5.734 |
| 400Modulus | [MPa] | 7.363 | 8.183 | 7.346 | 7.759 |
| 500Modulus | [MPa] | 9.029 | 9.738 | 9.136 | 9.301 |
| Energy To Break | [J] | 8.715 | 10.185 | 7.823 | 9.017 |
| Stress At Break | [MPa] | 10.022 | 10.772 | 9.613 | 9.967 |
| % Strain At Break | [%] | 571.68 | 595.12 | 518.2 | 558.18 |

TABLE 10B10

EFFECT OF THE EXAMPLE EMCC LOW TG LIQUID RESIN SYSTEMS ON THE EXXPRO™ MDX 03-1 COMPOSITION PROPERTIES, TENSILE 1000 TEST, SECOND SET

| Tensile 1000 Test | | 10B10-1 | 10B10-2 | 10B10-3 |
|---|---|---|---|---|
| 10Modulus | [MPa] | 0.45 | 0.429 | 0.457 |
| 20Modulus | [MPa] | 0.638 | 0.62 | 0.675 |
| 30Modulus | [MPa] | 0.774 | 0.749 | 0.822 |
| 40Modulus | [MPa] | 0.893 | 0.862 | 0.95 |
| 50Modulus | [MPa] | 1.002 | 0.972 | 1.072 |
| 60Modulus | [MPa] | 1.11 | 1.083 | 1.195 |
| 100Modulus | [MPa] | 1.645 | 1.612 | 1.771 |
| 200Modulus | [MPa] | 3.466 | 3.536 | 3.859 |
| 300Modulus | [MPa] | 5.564 | 5.761 | 6.276 |
| 400Modulus | [MPa] | 7.403 | 7.721 | 8.464 |
| 500Modulus | [MPa] | 8.801 | 9.163 | 10.193 |
| Energy To Break | [J] | 7.61 | 7.845 | 7.262 |
| Stress At Break | [MPa] | 9.511 | 10.036 | 10.372 |
| % Strain At Break | [%] | 566.81 | 572.196 | 511.042 |

TABLE 10A11

EFFECT OF THE EXAMPLE EMCC LOW TG LIQUID RESIN SYSTEMS ON THE EXXPRO™ MDX 03-1 COMPOSITION PROPERTIES, ADHESION 25 × 150, FIRST SET

| Adhesion 25 × 150 | | 10A11-1 | 10A11-2 | 10A11-3 | 10A11-4 |
|---|---|---|---|---|---|
| TESTvs | | Self | Self | Self | Self |
| Test Temp | [° C.] | 23 | 23 | 23 | 23 |
| Speed | [mm/min.] | 50.8 | 50.8 | 50.8 | 50.8 |
| Peak Load | [N] | 434.2 | 350.13 | 417.45 | 443.25 |
| Tear Resist | [N/mm] | 8.826 | 8.439 | 16.053 | 17.431 |
| Tear Type | | Broke | Broke | Broke | Broke |

TABLE 10B11

EFFECT OF THE EXAMPLE EMCC LOW TG LIQUID RESIN SYSTEMS ON THE EXXPRO™ MDX 03-1 COMPOSITION PROPERTIES, ADHESION 25 × 150, SECOND SET

| Adhesion 25 × 150 | | 10B11-1 | 10B11-2 | 10B11-3 |
|---|---|---|---|---|
| TESTvs | | Self | Self | Self |
| Test Temp | [° C.] | 23 | 23 | 23 |
| Speed | [mm/min.] | 50.8 | 50.8 | 50.8 |
| Peak Load | [N] | 427.95 | 321.717 | 376.629 |
| Tear Resist | [N/mm] | 16.825 | 12.666 | 14.802 |
| Tear Type | | Broke | Broke | Broke |

Example 6

Butyl based compositions were made with various blends of different low Tg liquid resins Struktol 40 MS with EXXPRO™MDX 03-1 (an isobutylene-co-para-methyl-styrene based elastomer). Table 11A through Table 11B shows the effect of blended resins on composition properties. The addition of these blends can be used to balance the butyl based composition properties, which is desirable for applications such as tire inner liners.

TABLE 11A

EFFECT OF EXAMPLE BLENDS OF EMCC LOW TG LIQUID RESIN AND HYDROCARBON SYSTEMS ON THE TG AND PERMEABILITY OF ISOBUTYLENE-ISOPRENE COMPOSITION, FIRST SET OF COMPOSITIONS

| Formulation | Units | 11A-1 | 11A-2 | 11A-3 | 11A-4 |
|---|---|---|---|---|---|
| EXXPRO™ 03-1 | phr | 100 | 100 | 100 | 100 |
| N660 | phr | 60 | 60 | 60 | 60 |
| STRUKTOL™ 40 MS | phr | 7 | | | 4 |
| ESCOREZ™ 1102 | phr | 4 | 4 | 2 | 2 |
| Stearic Acid | phr | 1 | 1 | 1 | 1 |
| MgO | phr | 0.15 | 0.15 | 0.15 | 0.15 |
| Naphthenic Oil | phr | | 8 | 8 | 8 |
| TDAE Oil | phr | 8 | | | |
| Experimental Cyclic Resin | phr | | 10 | 10 | 6 |
| NP Batch | phr | 180.15 | 183.15 | 181.15 | 181.15 |
| Zinc Oxide | phr | 1 | 1 | 1 | 1 |
| MBTS | phr | 1.25 | 1.25 | 1.25 | 1.25 |
| Sulfur | phr | 0.5 | 0.5 | 0.5 | 0.5 |
| Final Batch | phr | 182.9 | 185.9 | 183.9 | 183.9 |
| Compound Properties | | | | | |
| ML (1 + 4) | MU | 61.6 | 49.2 | 50.7 | 54.6 |
| MDR times by 10's | | | | | |
| Test Time | [Min] | 30 | 30 | 30 | 30 |
| Test Temp | [° C.] | 180 | 180 | 180 | 180 |
| Osc. angle | [Deg.] | 0.5 | 0.5 | 0.5 | 0.5 |
| MH − ML | [dNm] | 5.06 | 3.57 | 4.07 | 3.91 |
| ts2 | [Min] | 4.01 | 3.85 | 3.96 | 3.56 |
| t90 | [Min] | 9.36 | 7.44 | 8.98 | 7.04 |
| Green Strength | | | | | |
| PeakStress | [MPa] | 0.537 | 0.472 | 0.453 | 0.455 |
| StrnAtPeak | [%] | 74 | 71 | 50 | 75 |
| Hardness | | | | | |
| Hardness | Zwick [Shore A] | 47 | 44 | 46 | 43 |
| Tensile Properties | | | | | |
| 100Modulus | [MPa] | 1.771 | 1.374 | 1.47 | 1.377 |
| 300Modulus | [MPa] | 5.578 | 4.207 | 4.779 | 4.139 |
| StressAtBreak | [MPa] | 10.679 | 7.31 | 7.521 | 8.551 |
| % StrainAtBreak | [%] | 722 | 551 | 462 | 707 |
| Permeability | | | | | |
| Permeability Coefficient | cc · mm/ (m² · day · mmHg) | 0.232 | 0.259 | 0.203 | 0.211 |

TABLE 11B

EFFECT OF EXAMPLE BLENDS OF EMCC LOW TG LIQUID RESIN AND HYDROCARBON SYSTEMS ON THE TG AND PERMEABILITY OF ISOBUTYLENE-ISOPRENE COMPOSITION, SECOND SET OF COMPOSITIONS

| Formulation | Units | 11B-1 | 11B-2 | 11B-3 |
|---|---|---|---|---|
| EXXPRO™ 03-1 | phr | 100 | 100 | 100 |
| N660 | phr | 60 | 60 | 60 |
| STRUKTOL™ 40 MS | phr | | 4 | 4 |
| ESCOREZ™ 1102 | phr | 2 | 2 | 2 |
| Stearic Acid | phr | 1 | 0.57 | 0.57 |

TABLE 11B-continued

EFFECT OF EXAMPLE BLENDS OF EMCC LOW TG LIQUID RESIN AND HYDROCARBON SYSTEMS ON THE TG AND PERMEABILITY OF ISOBUTYLENE-ISOPRENE COMPOSITION, SECOND SET OF COMPOSITIONS

| Formulation | Units | 11B-1 | 11B-2 | 11B-3 |
|---|---|---|---|---|
| MgO | phr | 0.15 | 0.15 | 0.15 |
| Naphthenic Oil | phr | | 8 | 8 |
| TDAE Oil | phr | 8 | | |
| Experimental | phr | 6 | 6 | 10 |
| Cyclic Resin | | | | |
| NP Batch | phr | 181.15 | 180.72 | 180.72 |
| Zinc Oxide | phr | 1 | 2.52 | 2.52 |
| MBTS | phr | 1.25 | 2 | 2 |
| Sulfur | phr | 0.5 | 1.17 | 1.17 |
| Final Batch | phr | 183.9 | 186.41 | 186.41 |
| Compound Properties | | | | |
| ML (1 + 4) | MU | 60.2 | 55.6 | 51.4 |
| MDR times by 10's | | | | |
| Test Time | [Min] | 30 | 30 | 30 |
| Test Temp | [° C.] | 180 | 180 | 180 |
| Osc. angle | [Deg.] | 0.5 | 0.5 | 0.5 |
| MH − ML | [dNm] | 4.49 | 3.15 | 2.69 |
| ts2 | [Min] | 4.21 | 2.75 | 2.25 |
| t90 | [Min] | 9.39 | 3.77 | 2.81 |
| Green Strength | | | | |
| PeakStress | [MPa] | 0.504 | 0.46 | 0.426 |
| StrnAtPeak | [%] | 74 | 71 | 73 |
| Hardness | | | | |
| Hardness | Zwick [Shore A] | 46 | 43 | 41 |
| Tensile Properties | | | | |
| 100Modulus | [MPa] | 1.791 | 1.216 | 1.079 |
| 300Modulus | [MPa] | 5.936 | 3.127 | 2.558 |
| StressAtBreak | [MPa] | 9.825 | 7.681 | 4.968 |
| % StrainAtBreak | [%] | 566 | 873 | 656 |
| Permeability | | | | |
| Permeability Coefficient | cc · mm/ (m² · day · mmHg) | 0.171 | 0.138 | 0.181 |

We claim:

1. A hydrocarbon resin comprising:
an aromatic H mole content between about 0% to about 10%;
an olefin H mole content between about 0% to about 30%; and
an aliphatic H content between about 70% to about 100%,
wherein the resin has a number average molecular weight between about 20 to about 500 g/mole, a weight average molecular weight between about 100 to about 2,000 g/mole, and a glass transition temperature between about 0° C. to about −80° C.

2. The hydrocarbon resin of claim 1, wherein the aromatic H mole content is between about 0% to about 5%.

3. The hydrocarbon resin of claim 1, wherein the olefin H mole content is between about 0% to about 20%.

4. The hydrocarbon resin of claim 1, wherein the aliphatic H mole content is between about 75% to about 100%.

5. The hydrocarbon resin of claim 1, wherein the glass transition of the resin is between about −10° C. to −75° C.

6. The hydrocarbon resin of claim 1, wherein the glass transition temperature is between about −15° C. to −60° C.

7. A composition comprising:
(a) an isobutylene based polymer or an isobutylene copolymer; and
(b) a hydrocarbon resin having an aromatic H mole content between about 0% to about 10%; an olefin H mole content between about 0% to about 30%; and an aliphatic H content between about 70% to about 100%, wherein the hydrocarbon resin has a number average molecular weight between about 10 to about 1,000 g/mole, a weight average molecular weight between about 50 to about 5,000 g/mole, and a glass transition temperature between about 0° C. to about −80° C.

8. The composition of claim 7, wherein the isobutylene based polymer is an isobutylene-isoprene elastomer or a halogenated isobutylene based elastomer.

9. The composition of claim 7, wherein the isobutylene based polymer is butyl ("IIR").

10. The composition of claim 8, wherein the halogenated isobutylene based elastomer is bromobutyl ("BIIR"), chlorobutyl ("CIIR"), star branched bromobutyl ("SBB"), star branched chlorobutyl ("SBC"), or a halogenated isobutylene-co-para-methyl-styrene based elastomer.

11. The composition of claim 7, wherein the isobutylene based polymer is a homo-polymer, a copolymer, or combinations thereof.

12. The composition of claim 11, wherein the copolymer is isobutylene polymerized with co-monomers other than isoprene.

13. The composition of claim 7, further comprising one or more secondary polymers.

14. The composition of claim 7, further comprising one or more tackifier resins.

15. The composition of claim 7, further comprising a process oil.

16. The composition of claim 7, further comprising a plasticizer.

17. An article comprising the composition of claim 7.

18. A method of making a hydrocarbon resin comprising the steps of:
(a) providing a hydrocarbon reaction product comprising
(i) at least one of trans-pentadiene-1,3, cyclopentene, cis-pentadiene, and mixtures thereof;
(ii) a cyclic pentadiene component selected from the group consisting of: cyclopentadiene, cyclopentadiene dimer, cyclopentadiene trimer, cyclopentadiene-C₄ codimer, cyclopentadiene-piperylene codimer, cyclopentadiene methylcyclopentadiene codimer, methylcyclopentadiene, methylcyclopentadiene dimer, methylcyclopentadiene-C₄ codimer, methylcyclopentadiene-piperylene codimer, and mixtures thereof; and
(iii) an aromatic component selected from the group consisting of styrene, ortho-methyl-styrene, meta-methyl-styrene, para-methyl-styrene, alpha-methyl-styrene, t-beta-methyl-styrene, indene, methyl indene, vinyl toluene, and combinations thereof,
(b) quenching the reaction product with an isopropanol and water mixture to form a quenched reaction product;
(c) separating an aqueous layer from the quenched reaction product; and
(d) separating paraffins from the aqueous layer to produce the hydrocarbon resin,
wherein the hydrocarbon resin has an aromatic H mole content between about 0% to about 10%; an olefin H mole content is between about 0% to about 30% and an aliphatic H content between about 70% to about 100%, a number average molecular weight between about 10 to about 1,000 g/mole, a weight average molecular weight between about 50 to about 5,000 g/mole, and a glass transition temperature between about 0° C. to about −80° C.

19. The method of claim 18, wherein the reaction product has about 10 to about 20 wt % of raffinate, based on the total weight of the reaction product.

20. An article made by the method of claim 18.

* * * * *